(12) United States Patent
Ninomiya et al.

(10) Patent No.: US 10,713,395 B2
(45) Date of Patent: Jul. 14, 2020

(54) METHOD FOR DESIGNING AND MANUFACTURING CUSTOM-MADE FURNITURE USING COMPUTER, SYSTEM, AND PROGRAM THEREFOR

(71) Applicant: Domans, Inc., Tokyo (JP)

(72) Inventors: Kenichi Ninomiya, Tokyo (JP); Hiroyuki Masuda, Tokyo (JP)

(73) Assignee: DOMANS, INC., Tokyo (JP)

( * ) Notice: Subject to any disclaimer, the term of this patent is extended or adjusted under 35 U.S.C. 154(b) by 386 days.

(21) Appl. No.: 15/572,061

(22) PCT Filed: Jan. 31, 2017

(86) PCT No.: PCT/JP2017/003324
§ 371 (c)(1),
(2) Date: Nov. 6, 2017

(87) PCT Pub. No.: WO2017/135222
PCT Pub. Date: Aug. 10, 2017

(65) Prior Publication Data
US 2018/0089336 A1 Mar. 29, 2018

(30) Foreign Application Priority Data

Feb. 2, 2016 (JP) .................................. 2016-018216

(51) Int. Cl.
*G06F 30/00* (2020.01)
*G06T 19/20* (2011.01)
(Continued)

(52) U.S. Cl.
CPC .......... *G06F 30/00* (2020.01); *G06F 3/04845* (2013.01); *G06F 30/13* (2020.01);
(Continued)

(58) Field of Classification Search
CPC ...... G06F 30/00; G06F 30/13; G06F 3/04845; G06F 2111/04; G06F 2111/20;
(Continued)

(56) References Cited

U.S. PATENT DOCUMENTS 7,016,747 B1 * 3/2006 Ninomiya ............... G06F 19/00
700/97
2007/0262982 A1 * 11/2007 Ninomiya ............... G06T 19/20
345/419

(Continued)

FOREIGN PATENT DOCUMENTS

JP 10162048 A 6/1998
JP 2007164576 A * 6/2007
(Continued)

OTHER PUBLICATIONS

International Search Report for PCT/JP2017/003324 dated May 9, 2017.

*Primary Examiner* — Cedric Johnson
(74) *Attorney, Agent, or Firm* — Liang, Legal Group, PLLC

(57) ABSTRACT

A method of designing a furniture product includes displaying a first and a second part members on a screen such that a first face of the first part member and a second face of the second part member are in parallel; setting XY coordinate in which a corner of a rectangle of each face of the first and second part members is set as an origin, and two sides extending orthogonally from the corner are set as X axis and Y axis to designate a first position on the first face by the XY coordinate; perpendicularly projecting the first face of the first part member onto the second face of the second part member to calculate a position on the second face that corresponds to the first position and designating the calcu-
(Continued)

lated position on the second face as a second position by the XY coordinate on the second face.

5 Claims, 23 Drawing Sheets

(51) Int. Cl.
      *G06F 3/0484*       (2013.01)
      *G06F 30/13*       (2020.01)
      *G06F 111/04*       (2020.01)
      *G06F 111/20*       (2020.01)
      *G06F 119/18*       (2020.01)
(52) U.S. Cl.
      CPC .......... *G06T 19/20* (2013.01); *G06F 2111/04* (2020.01); *G06F 2111/20* (2020.01); *G06F 2119/18* (2020.01); *G06T 2200/24* (2013.01); *G06T 2210/04* (2013.01); *G06T 2219/012* (2013.01); *G06T 2219/2008* (2013.01)
(58) Field of Classification Search
      CPC .. G06F 2119/18; G06F 17/50; G06F 17/5004; G06F 2217/06; G06F 2217/02; G06F 2217/12; G06T 19/20; G06T 2219/012; G06T 2210/04; G06T 2219/2008; G06T 2200/24
      USPC ............................................................ 703/1
See application file for complete search history.

(56) References Cited

U.S. PATENT DOCUMENTS

2008/0222568 A1*    9/2008    Okuwaki ................ G06F 30/00
                                                                                                         715/825
2013/0201189 A1    8/2013    Saal et al.

FOREIGN PATENT DOCUMENTS

JP        2007164576 A        6/2007
WO       2006064971 A1       6/2006

* cited by examiner

[FIG.1]
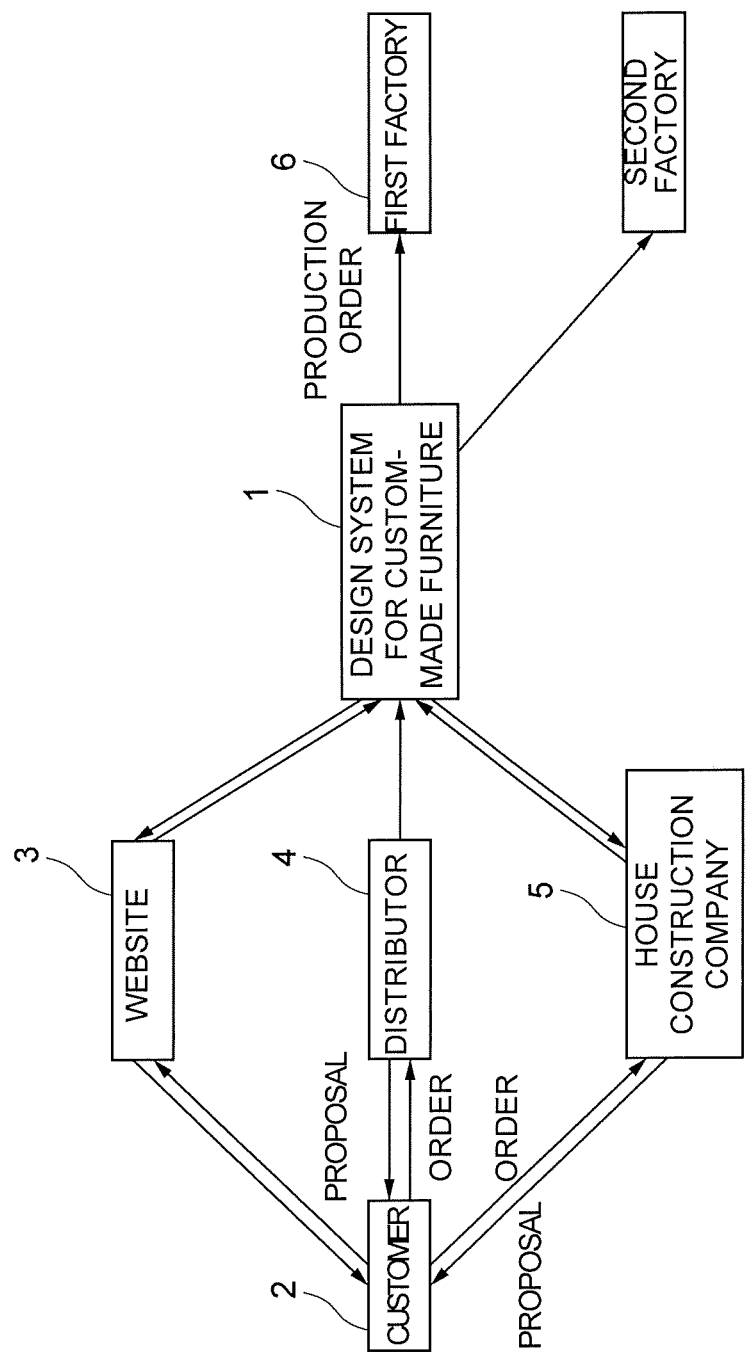

[FIG.2]
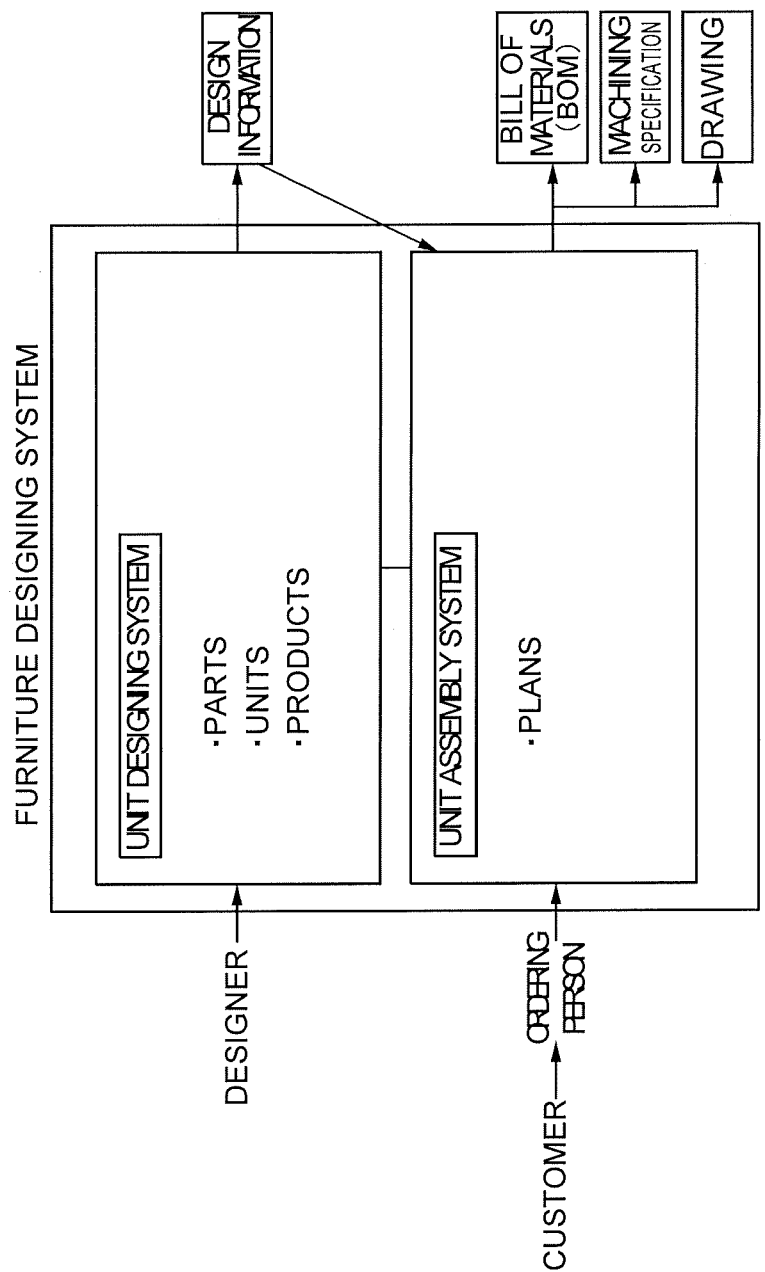

[FIG.3]
(A) 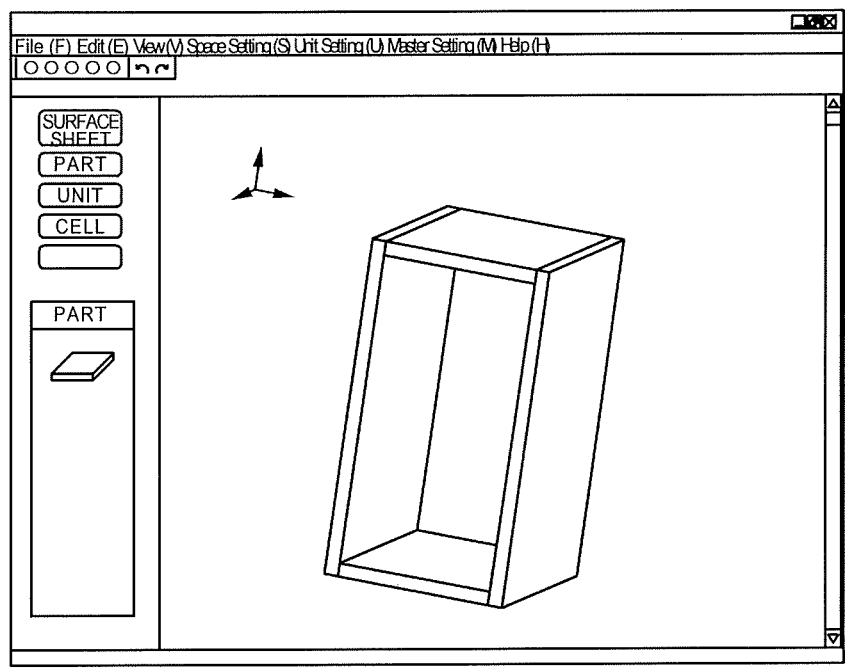
(B) 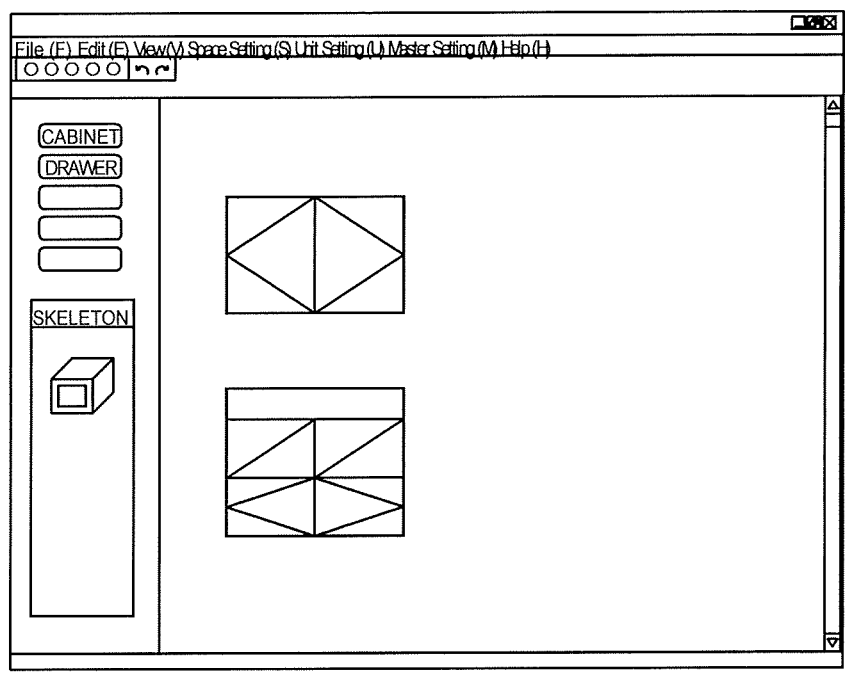

[FIG.4]
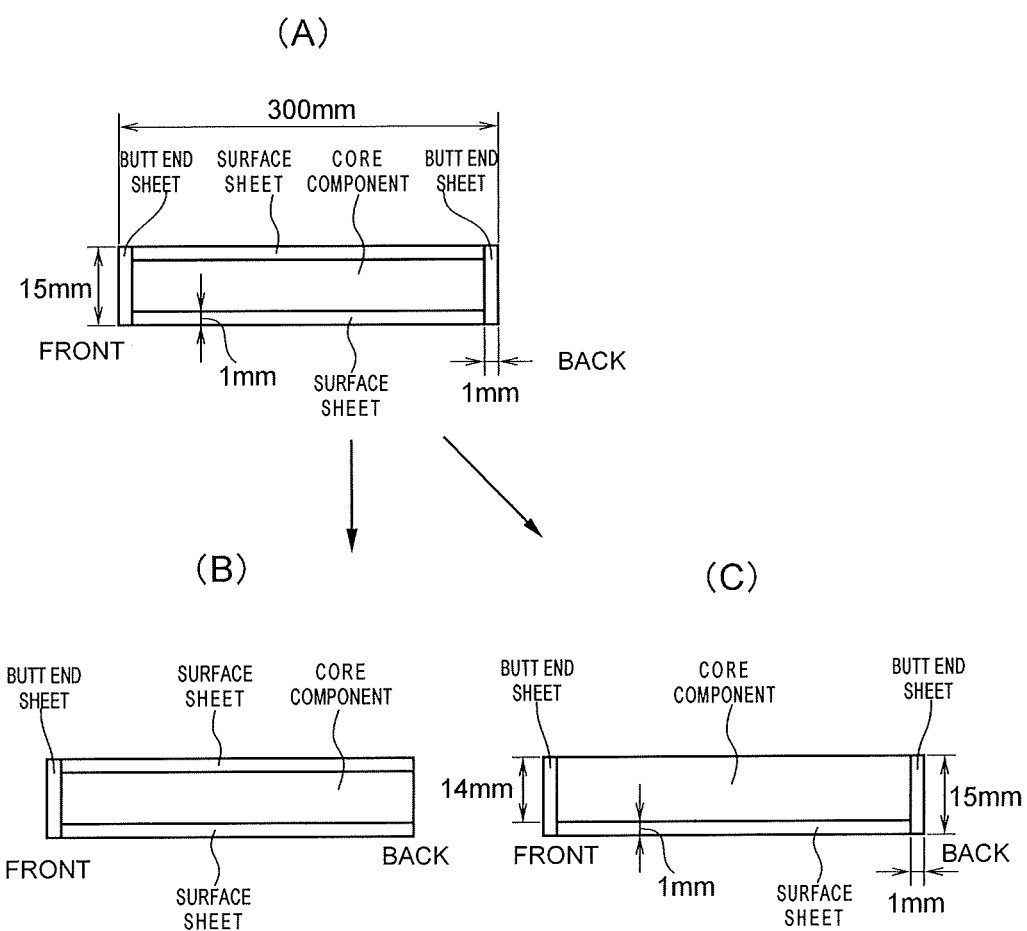

[FIG.5]
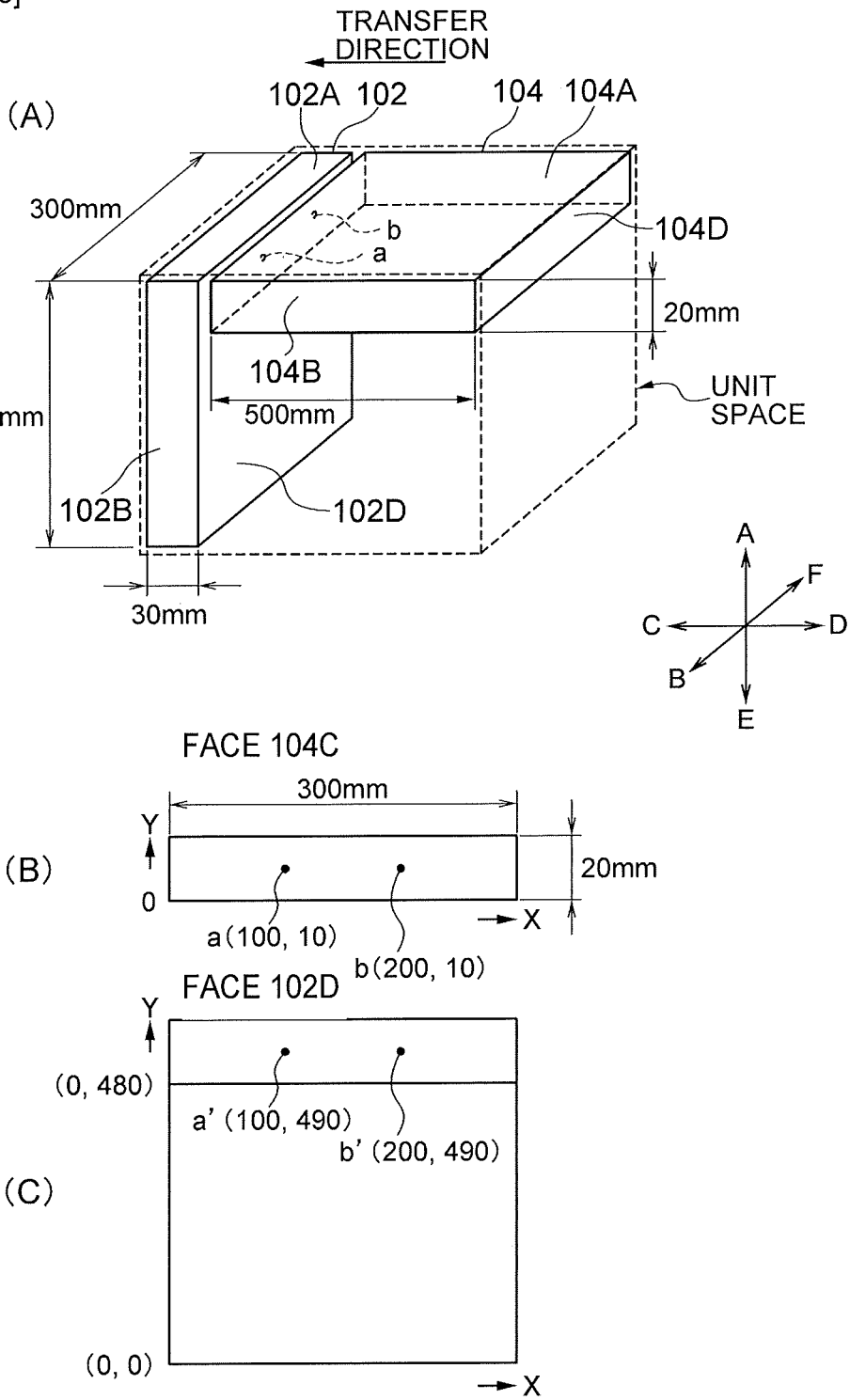

[FIG.6]
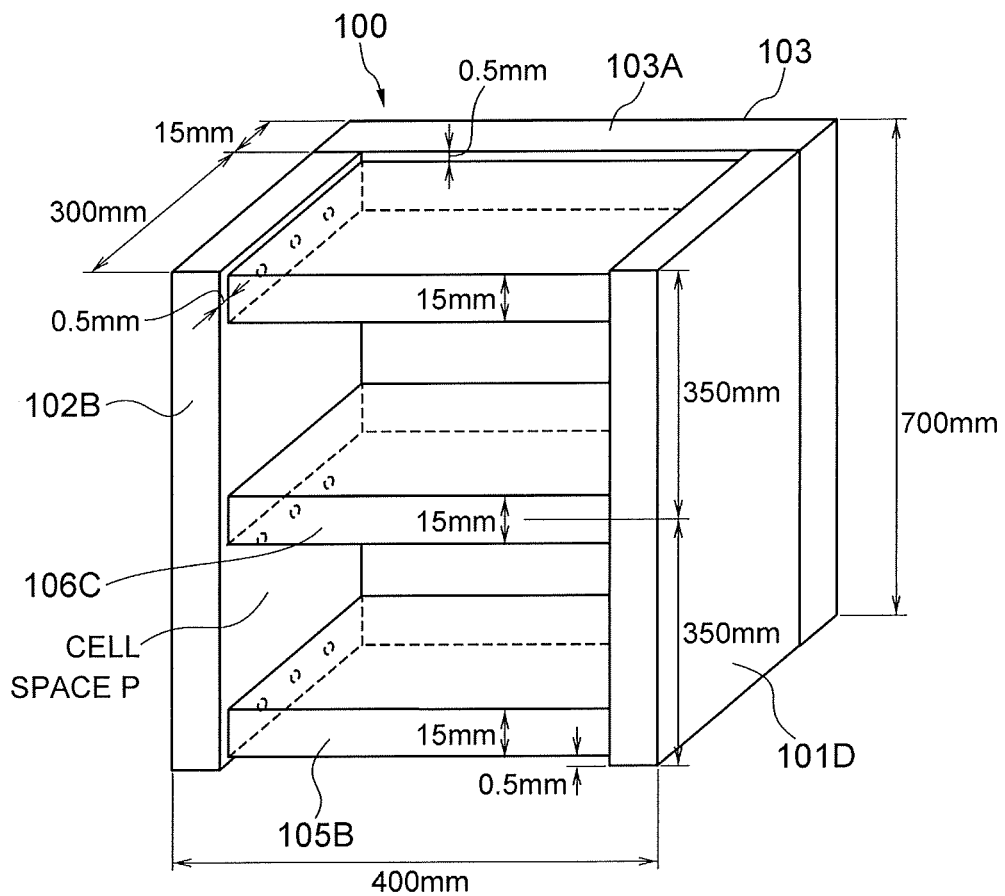
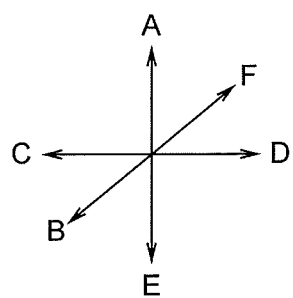

[FIG.7]
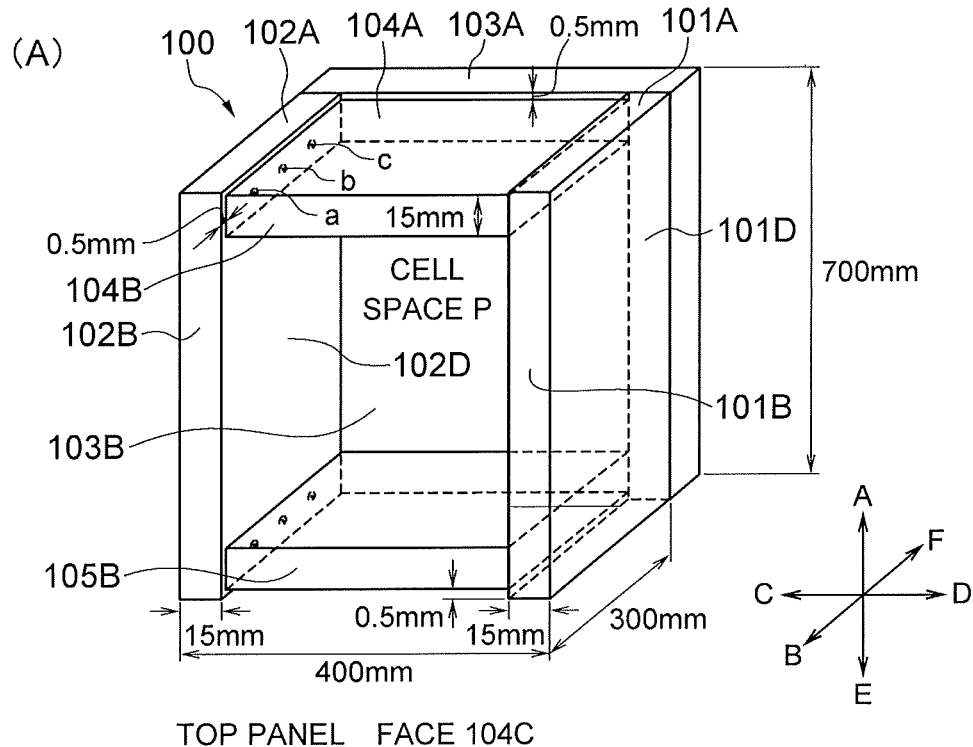
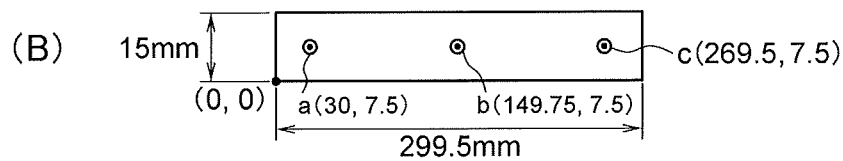
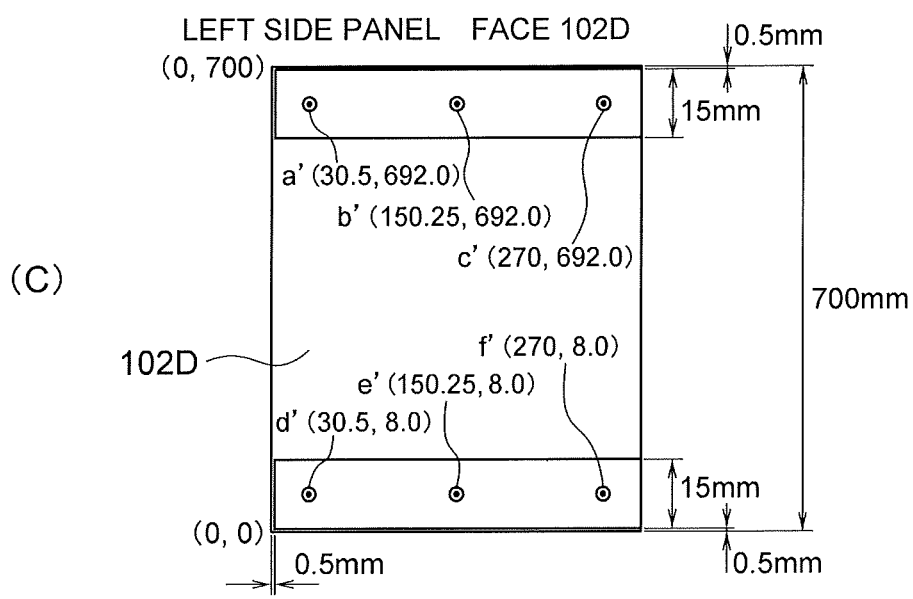

[FIG.8]

| | FACE 1 | | FACE 2 | | DISTANCE | STATE OF FACE 2 IN RELATION WITH FACE 1 |
|---|---|---|---|---|---|---|
| 1 | LEFT SIDE PANEL 102 | RIGHT SIDE FACE 102D | TOP PANEL 104 | LEFT SIDE FACE 104C | 0 | SAME PLANE |
| 2 | LEFT SIDE PANEL 102 | RIGHT SIDE FACE 102D | BOTTOM PANEL 105 | LEFT SIDE FACE 105C | 0 | SAME PLANE |
| 3 | LEFT SIDE PANEL 102 | LEFT SIDE FACE 102C | BACK PANEL 103 | LEFT SIDE FACE 103C | 0 | SAME PLANE |
| 4 | LEFT SIDE PANEL 102 | FRONT FACE 102B | RIGHT SIDE PANEL 101 | FRONT FACE 101B | 0 | SAME PLANE |
| 5 | LEFT SIDE PANEL 102 | FRONT FACE 102B | TOP PANEL 104 | FRONT FACE 104B | 0.5 mm | SEPARATE |
| 6 | LEFT SIDE PANEL 102 | FRONT FACE 102B | BOTTOM PANEL 105 | FRONT FACE 105B | 0.5 mm | SEPARATE |
| 7 | LEFT SIDE PANEL 102 | BACK FACE 102F | RIGHT SIDE PANEL 101 | BACK FACE 101F | 0 | SAME PLANE |
| 8 | LEFT SIDE PANEL 102 | BACK FACE 102F | TOP PANEL 104 | BACK FACE 104F | 0 | SAME PLANE |
| 9 | LEFT SIDE PANEL 102 | BACK FACE 102F | BOTTOM PANEL 105 | BACK FACE 105F | 0 | SAME PLANE |
| 10 | LEFT SIDE PANEL 102 | BACK FACE 102F | BACK PANEL 103 | FRONT FACE 103B | 0 | SAME PLANE |
| 11 | LEFT SIDE PANEL 102 | UPPER FACE 102A | TOP PANEL 104 | UPPER FACE 104A | 0.5 mm | SEPARATE |
| 12 | LEFT SIDE PANEL 102 | UPPER FACE 102A | RIGHT SIDE PANEL 101 | UPPER FACE 101A | 0 | SAME PLANE |
| 13 | LEFT SIDE PANEL 102 | LOWER FACE 102E | BOTTOM PANEL 105 | LOWER FACE 105E | 0.5 mm | SEPARATE |
| 14 | LEFT SIDE PANEL 102 | LOWER FACE 102E | RIGHT SIDE PANEL 101 | LOWER FACE 101E | 0 | SAME PLANE |
| 15 | LEFT SIDE PANEL 102 | UPPER FACE 102A | BACK PANEL 103 | UPPER FACE 103A | 0 | SAME PLANE |
| 16 | LEFT SIDE PANEL 102 | LOWER FACE 102E | BACK PANEL 103 | LOWER FACE 103E | 0 | SAME PLANE |
| 17 | RIGHT SIDE PANEL 101 | LEFT SIDE FACE 101C | TOP PANEL 104 | RIGHT SIDE FACE 104D | 0 | SAME PLANE |
| 18 | RIGHT SIDE PANEL 101 | LEFT SIDE FACE 101C | BOTTOM PANEL 105 | RIGHT SIDE FACE 105D | 0 | SAME PLANE |
| 19 | RIGHT SIDE PANEL 101 | RIGHT SIDE FACE 101D | BACK PANEL 103 | RIGHT SIDE FACE 103D | 0 | SAME PLANE |

[FIG.9]

|   | FACE 1 | FACE 2 | DISTANCE |
|---|--------|--------|----------|
| 1 | UNIT SPACE UPPER FACE (FACE A) | UPPER FACE 102A OF LEFT SIDE PANEL | 0 |
| 2 | UNIT SPACE LOWER FACE (FACE E) | LOWER FACE 102E OF LEFT SIDE PANEL | 0 |
| 3 | UNIT SPACE LEFT FACE (FACE C) | LEFT FACE 102C OF LEFT SIDE PANEL | 0 |
| 4 | UNIT SPACE RIGHT FACE (FACE D) | RIGHT FACE 101D OF RIGHT SIDE PANEL | 0 |
| 5 | UNIT SPACE FRONT FACE (FACE B) | FRONT FACE 102B OF LEFT SIDE PANEL | 0 |
| 6 | UNIT SPACE BACK FACE (FACE F) | BACK FACE 103F OF BACK PANEL | 0 |

[FIG.10]
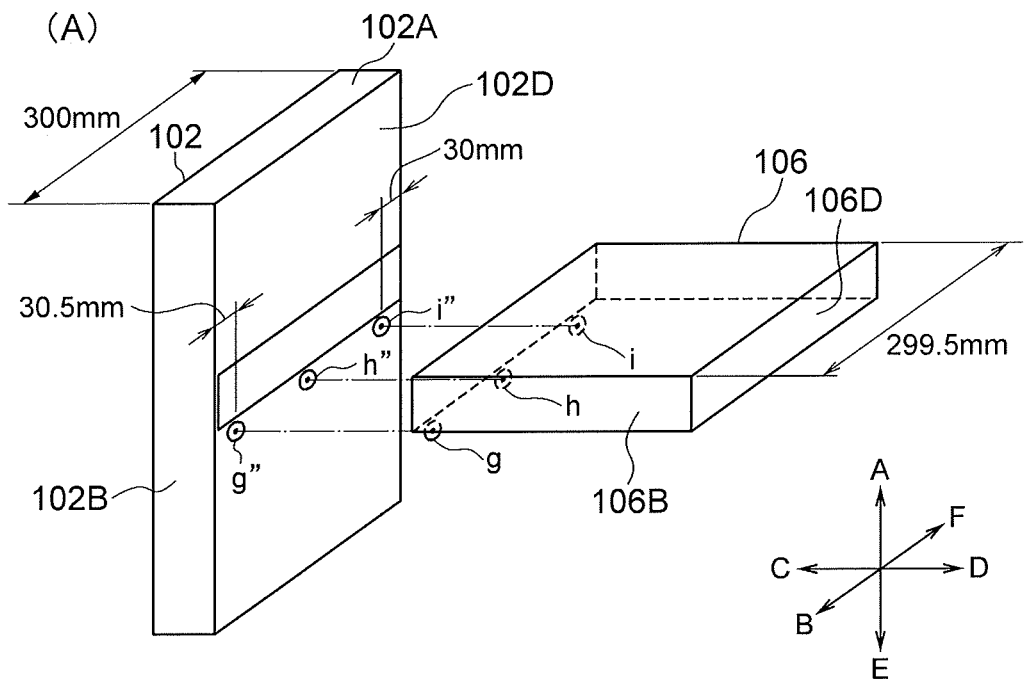
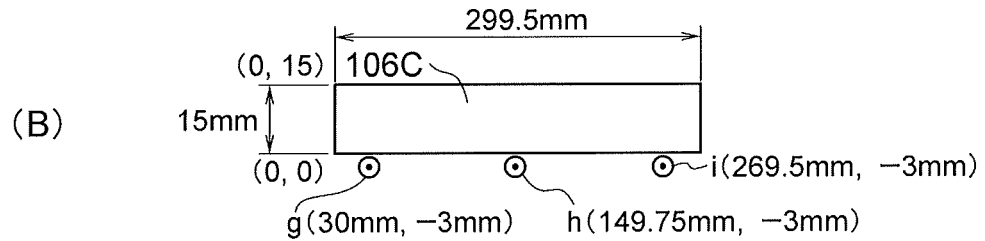
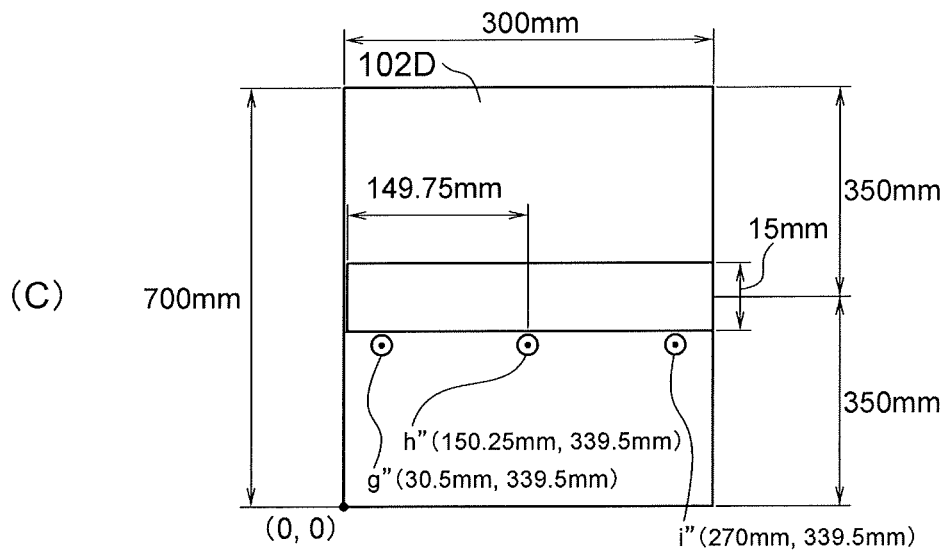

[FIG.11]
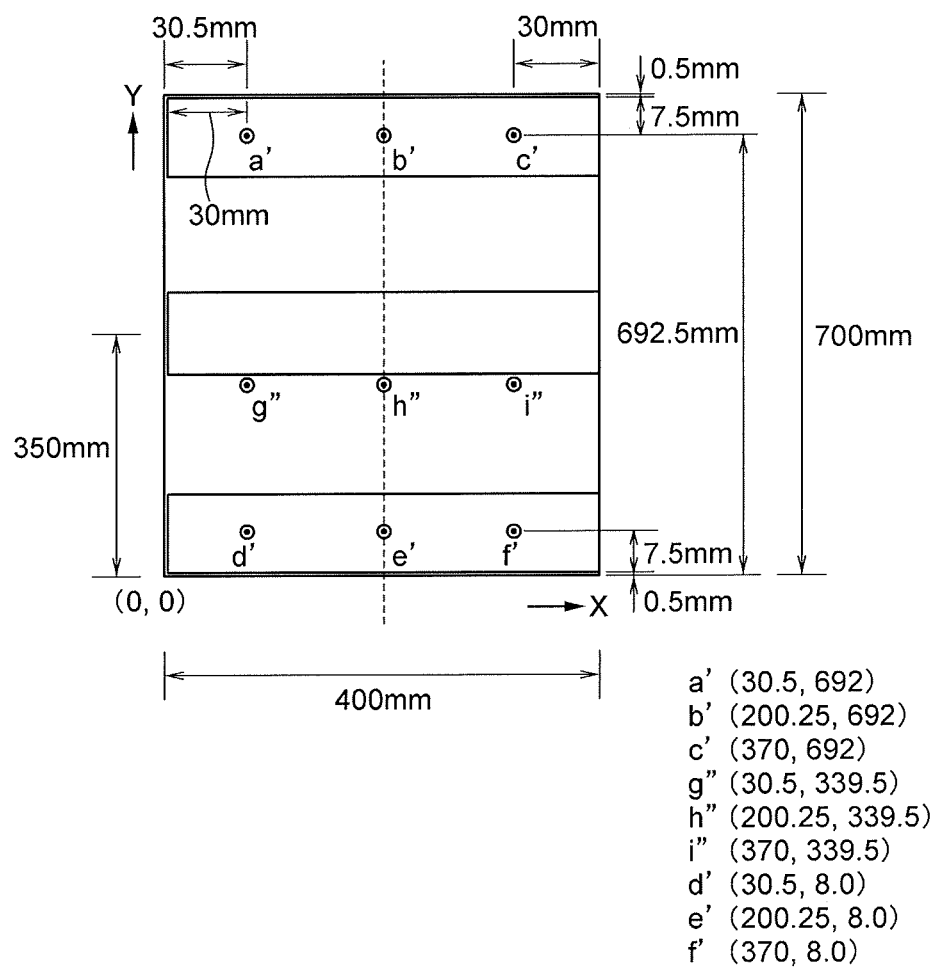

[FIG.12]
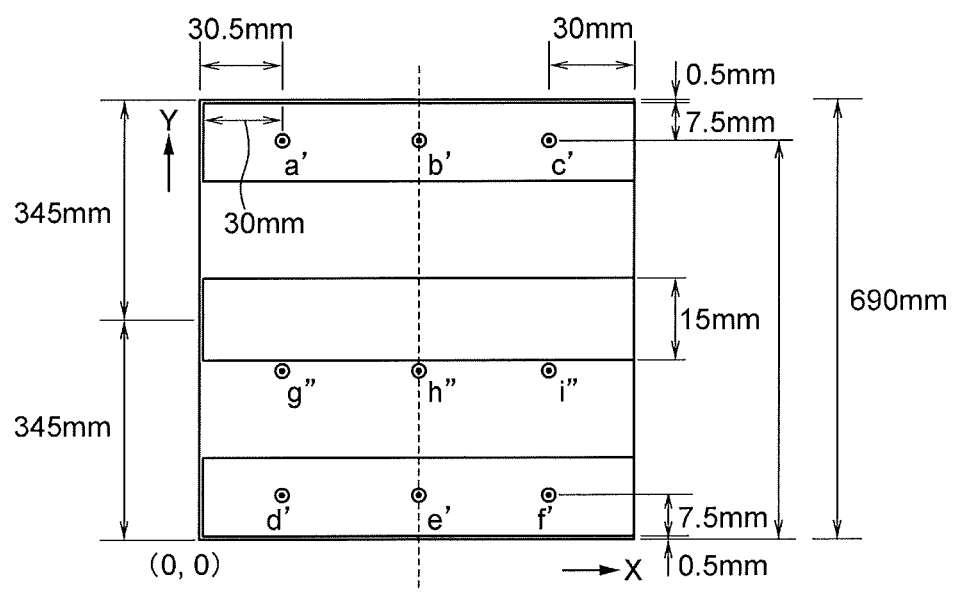

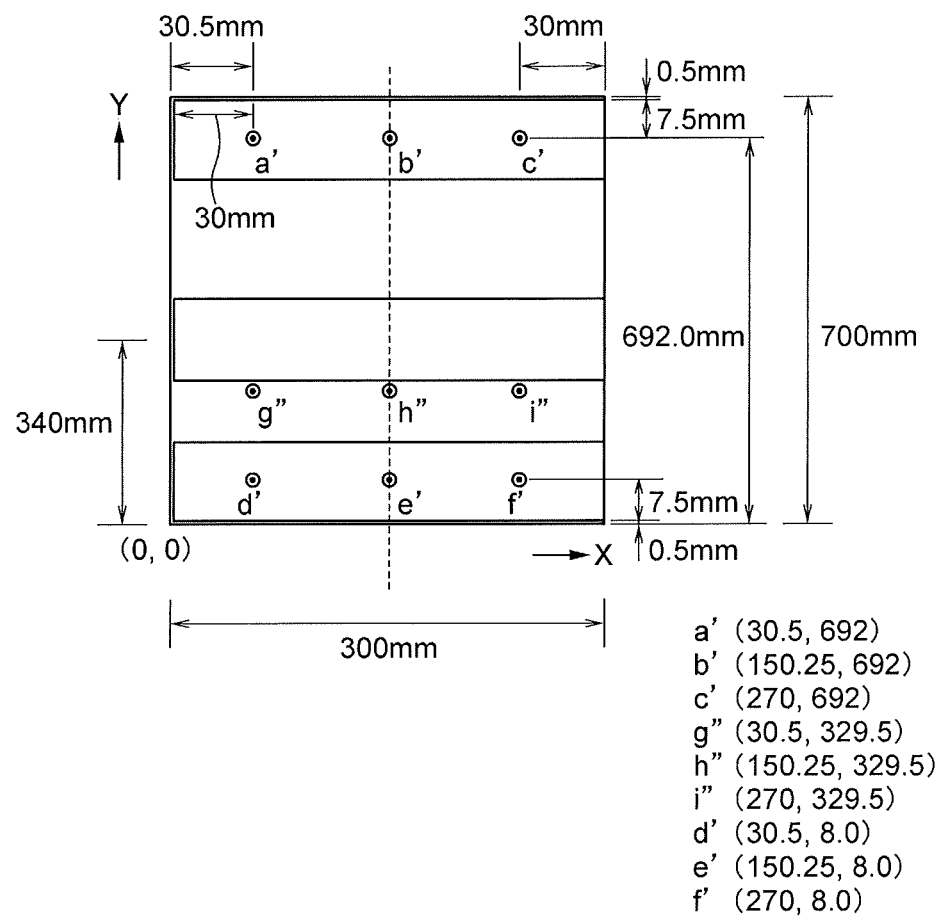

[FIG.14]

BILL OF MATERIALS (BOM DATA)

| PRODUCT NUMBER | UNIT NUMBER | PART MEMBER NUMBER | PART MEMBER NAME | | MATERIAL | LATERAL LENGTH | VERTICAL LENGTH | THICKNESS | QUANTITY |
|---|---|---|---|---|---|---|---|---|---|
| 001 | 1 | 102 | LEFT SIDE PANEL | | | 300 mm | 700 mm | 15 mm | 1 |
| 001 | 1 | 102 | LEFT SIDE PANEL | 1 | SOLID MATERIAL | 300 mm | 700 mm | 15 mm | 1 |
| 001 | 1 | 101 | RIGHT SIDE PANEL | | | 300 mm | 700 mm | 15 mm | 1 |
| 001 | 1 | 101 | RIGHT SIDE PANEL | 1 | SOLID MATERIAL | 300 mm | 700 mm | 15 mm | 1 |
| 001 | 1 | 104 | TOP PANEL | | | 370 mm | 299.5 mm | 15 mm | 1 |
| 001 | 1 | 104 | TOP PANEL 1 | 1 | SOLID MATERIAL | 370 mm | 299.5 mm | 15 mm | 1 |
| 001 | 1 | 105 | BOTTOM PANEL | | | 370 mm | 299.5 mm | 15 mm | 1 |
| 001 | 1 | 105 | BOTTOM PANEL 1 | 1 | SOLID MATERIAL | 370 mm | 299.5 mm | 15 mm | 1 |
| 001 | 1 | 103 | BACK PANEL | | | 400 mm | 700 mm | 15 mm | 1 |
| 001 | 1 | 103 | BACK PANEL | 1 | SOLID MATERIAL | 400 mm | 700 mm | 15 mm | 1 |
| 001 | 2 | 106 | SHELF PANEL | | | 369 mm | 285 mm | 15 mm | 1 |
| 001 | 2 | 106 | SHELF PANEL | 1 | CORE COMPONENT | 367 mm | 297.5 mm | 15 mm | 1 |
| 001 | 2 | 106 | SHELF PANEL | 2 | SURFACE SHEET | 369 mm | 284 mm | 1 mm | 2 |
| 001 | 2 | 106 | SHELF PANEL | 4 | BUTT END SHEET | 289 mm | 15 mm | 1 mm | 2 |
| 001 | 2 | 107 | DOWEL | | | 6 mm | 8 mm | | 18 |

[FIG.15]

(A) MACHINING SPECIFICATION OF LEFT SIDE PANEL 102     FIG.6

| HOLE | FACE NUMBER | MACHINING TYPE | X | Y | DEPTH | DIAMETER | |
|---|---|---|---|---|---|---|---|
| a' | 102D | BORING | 30.5 mm | 692.0 mm | 8 mm | 6 mm | TRANSFER FROM a OF 104C |
| b' | 102D | BORING | 150.25 mm | 692.0 mm | 8 mm | 6 mm | TRANSFER FROM b OF 104C |
| c' | 102D | BORING | 270 mm | 692.0 mm | 8 mm | 6 mm | TRANSFER FROM c OF 104C |
| g" | 102D | BORING | 30.5 mm | 339.5 mm | 8 mm | 6 mm | TRANSFER FROM g OF 106C |
| h" | 102D | BORING | 150.25 mm | 339.5 mm | 8 mm | 6 mm | TRANSFER FROM h OF 106C |
| i" | 102D | BORING | 270 mm | 339.5 mm | 8 mm | 6 mm | TRANSFER FROM i OF 106C |
| d' | 102D | BORING | 30.5 mm | 8.0 mm | 8 mm | 6 mm | TRANSFER FROM d OF 105C |
| e' | 102D | BORING | 150.25 mm | 8.0 mm | 8 mm | 6 mm | TRANSFER FROM e OF 105C |
| f' | 102D | BORING | 270 mm | 8.0 mm | 8 mm | 6 mm | TRANSFER FROM f OF 105C |

(B) MACHINING SPECIFICATION OF DOWEL HOLE OF LEFT SIDE PANEL 102     FIG.12     HEIGHT 700 mm→690 mm

| HOLE | FACE NUMBER | MACHINING TYPE | X | Y | DEPTH | DIAMETER | |
|---|---|---|---|---|---|---|---|
| a' | 102D | BORING | 30.5 mm | 682.0 mm | 8 mm | 6 mm | TRANSFER FROM a OF 104C |
| b' | 102D | BORING | 150.25 mm | 682.0 mm | 8 mm | 6 mm | TRANSFER FROM b OF 104C |
| c' | 102D | BORING | 270 mm | 682.0 mm | 8 mm | 6 mm | TRANSFER FROM c OF 104C |
| g" | 102D | BORING | 30.5 mm | 334.5 mm | 8 mm | 6 mm | TRANSFER FROM g OF 106C |
| h" | 102D | BORING | 150.25 mm | 334.5 mm | 8 mm | 6 mm | TRANSFER FROM h OF 106C |
| i" | 102D | BORING | 270 mm | 334.5 mm | 8 mm | 6 mm | TRANSFER FROM i OF 106C |
| d' | 102D | BORING | 30.5 mm | 8.0 mm | 8 mm | 6 mm | TRANSFER FROM d OF 105C |
| e' | 102D | BORING | 150.25 mm | 8.0 mm | 8 mm | 6 mm | TRANSFER FROM e OF 105C |
| f' | 102D | BORING | 270 mm | 8.0 mm | 8 mm | 6 mm | TRANSFER FROM f OF 105C |

(C) MACHINING SPECIFICATION OF DOWEL HOLE OF LEFT SIDE PANEL 102     FIG.13     SHELF PANEL     LOWER BY 10 mm

| HOLE | FACE NUMBER | MACHINING TYPE | X | Y | DEPTH | DIAMETER | |
|---|---|---|---|---|---|---|---|
| a' | 102D | BORING | 30.5 mm | 692.0 mm | 8 mm | 6 mm | TRANSFER FROM a OF 104C |
| b' | 102D | BORING | 150.25 mm | 692.0 mm | 8 mm | 6 mm | TRANSFER FROM b OF 104C |
| c' | 102D | BORING | 270 mm | 692.0 mm | 8 mm | 6 mm | TRANSFER FROM c OF 104C |
| g" | 102D | BORING | 30.5 mm | 329.5 mm | 8 mm | 6 mm | TRANSFER FROM g OF 106C |
| h" | 102D | BORING | 150.25 mm | 329.5 mm | 8 mm | 6 mm | TRANSFER FROM h OF 106C |
| i" | 102D | BORING | 270 mm | 329.5 mm | 8 mm | 6 mm | TRANSFER FROM i OF 106C |
| d' | 102D | BORING | 30.5 mm | 8.0 mm | 8 mm | 6 mm | TRANSFER FROM d OF 105C |
| e' | 102D | BORING | 150.25 mm | 8.0 mm | 8 mm | 6 mm | TRANSFER FROM e OF 105C |
| f' | 102D | BORING | 270 mm | 8.0 mm | 8 mm | 6 mm | TRANSFER FROM f OF 105C |

PLAN VIEW
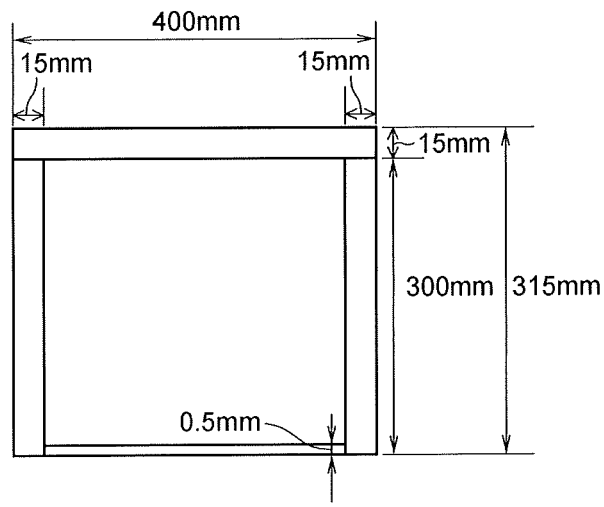
(B) FRONT VIEW      (C) RIGHT SIDE VIEW
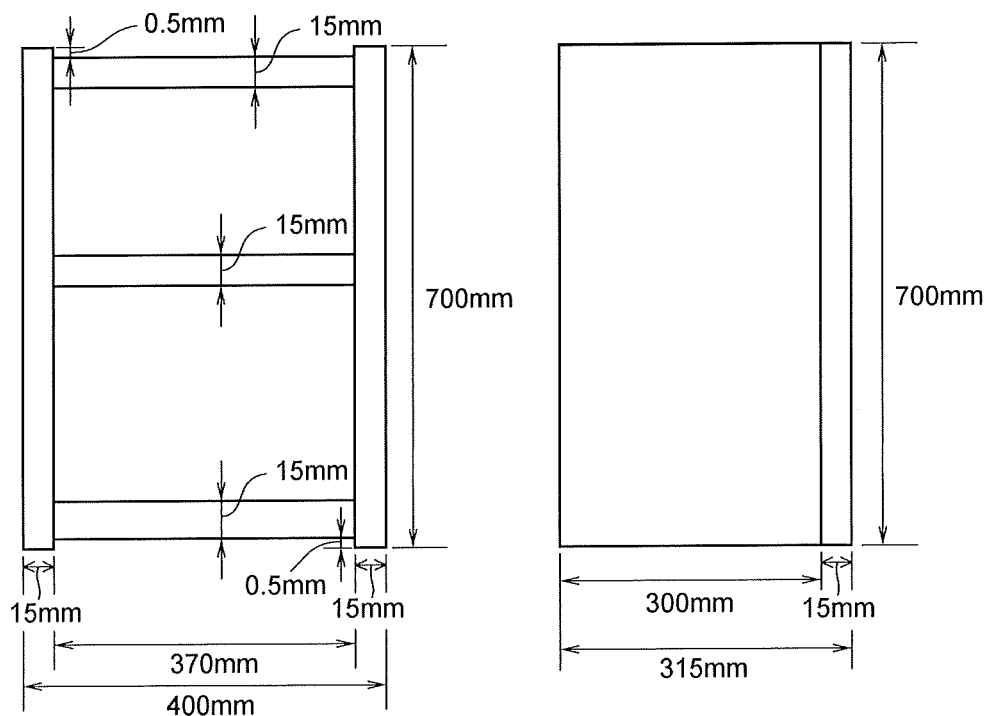

[FIG.17]
(A) RIGHT SIDE PANEL
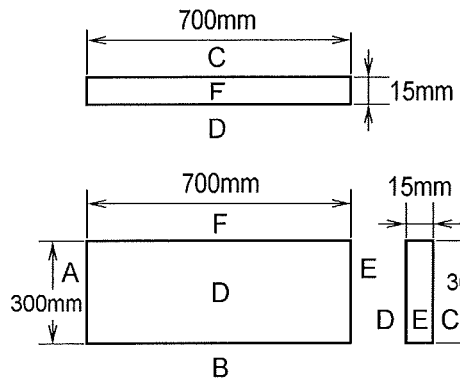
(B) LEFT SIDE PANEL
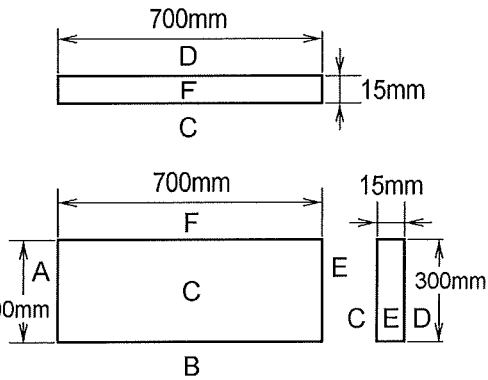
(C) TOP PANEL
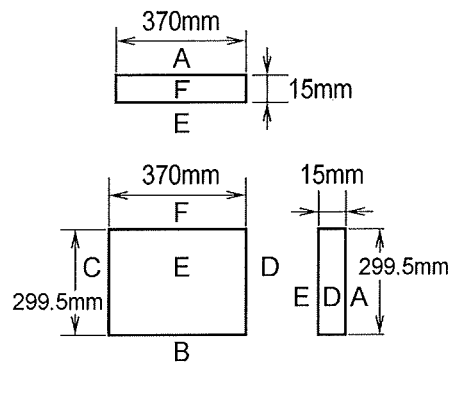
(D) BACK PANEL
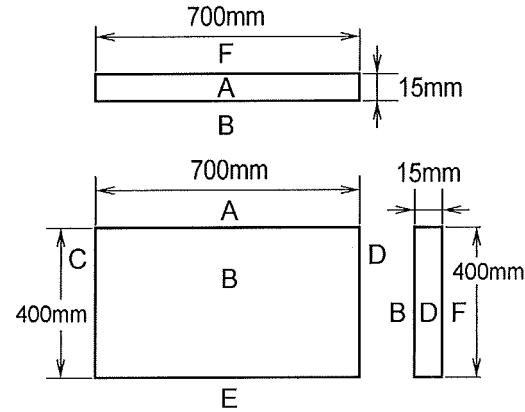
(E) BOTTOM PANEL
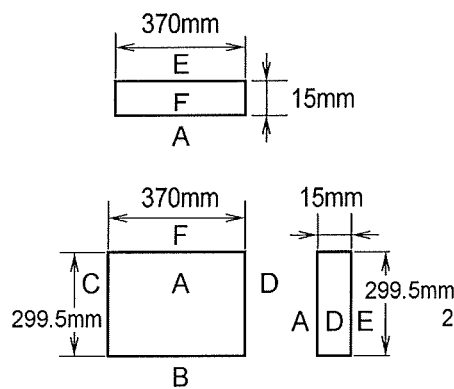
(F) SHELF PANEL
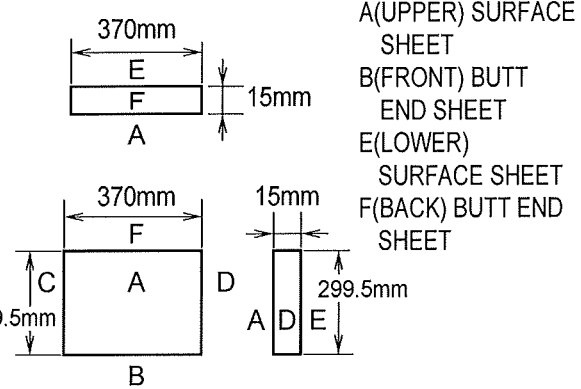
A(UPPER) SURFACE SHEET
B(FRONT) BUTT END SHEET
E(LOWER) SURFACE SHEET
F(BACK) BUTT END SHEET

[FIG.18]

FURNITURE COMPONENT MEMBER PRICE/DELIVERY TIME MASTER DATA

| MEMBER | SIZE (MINIMUM) | SIZE (MAXIMUM) | PRICE OF MATERIAL | TIME REQUIRED FOR PROCUREMENT |
|---|---|---|---|---|
| PANEL 1 | 100 mm × 100 mm | 900 mm × 1800 mm | 1500 YEN/m² | 3 DAYS |
| CORE COMPONENT1 | 100 mm × 100 mm | 900 mm × 1800 mm | 30 YEN × m² | 3 DAYS |
| SURFACE SHEET 1 | 100 mm × 100 mm | 900 mm × 1800 mm | 2000 YEN (900 × 1800) | 4 DAYS |
| BUTT END SHEET | 10 mm | 100 m | 17 YEN/m | 4 DAYS |
| DOWEL | - | - | 4 YEN/UNIT | 2 DAYS |

[FIG.19]
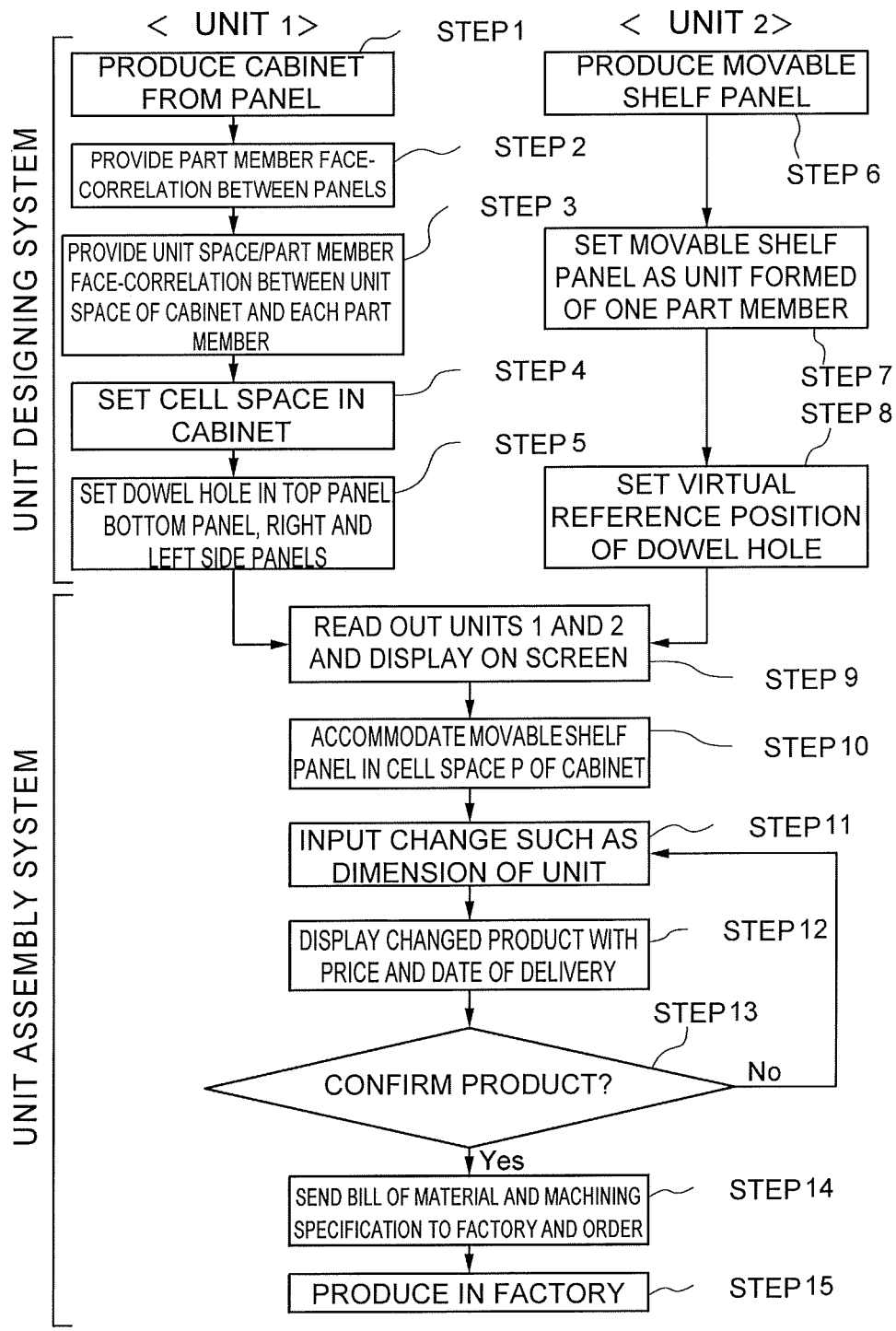

[FIG. 20]
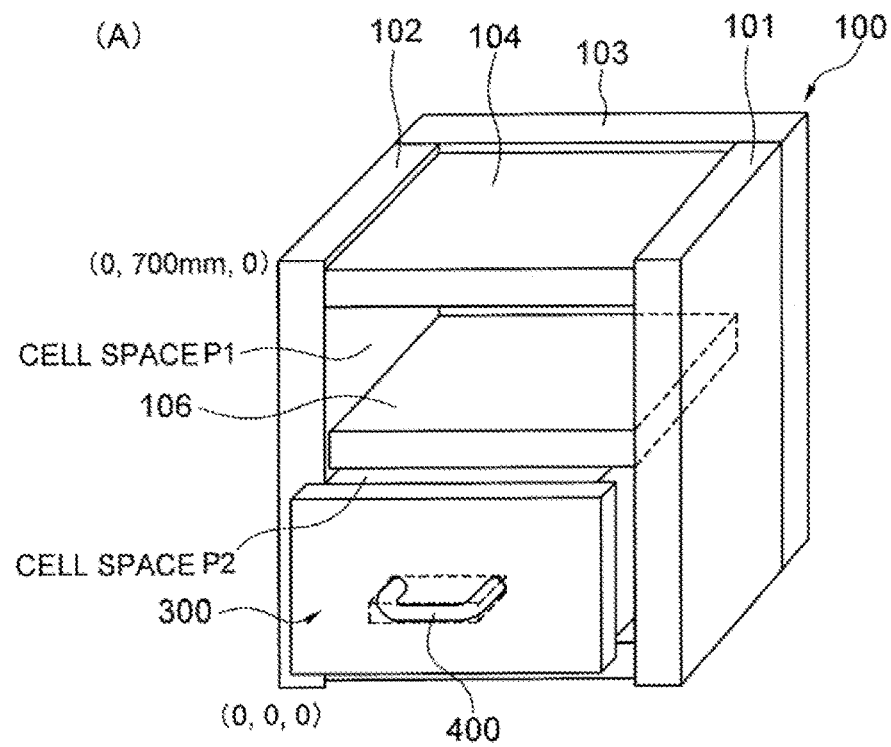
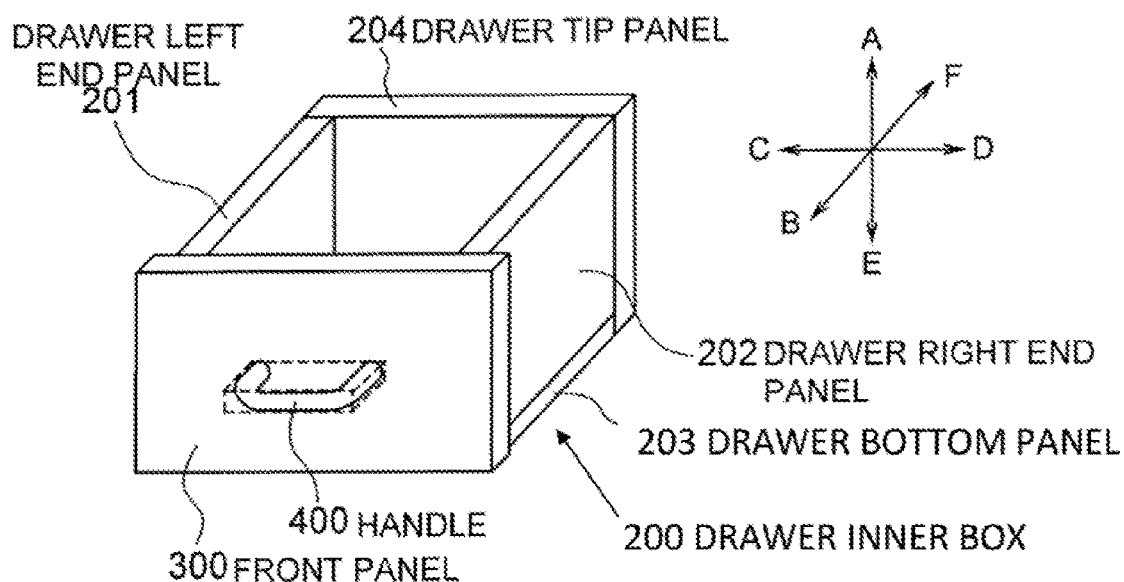

[FIG.21]
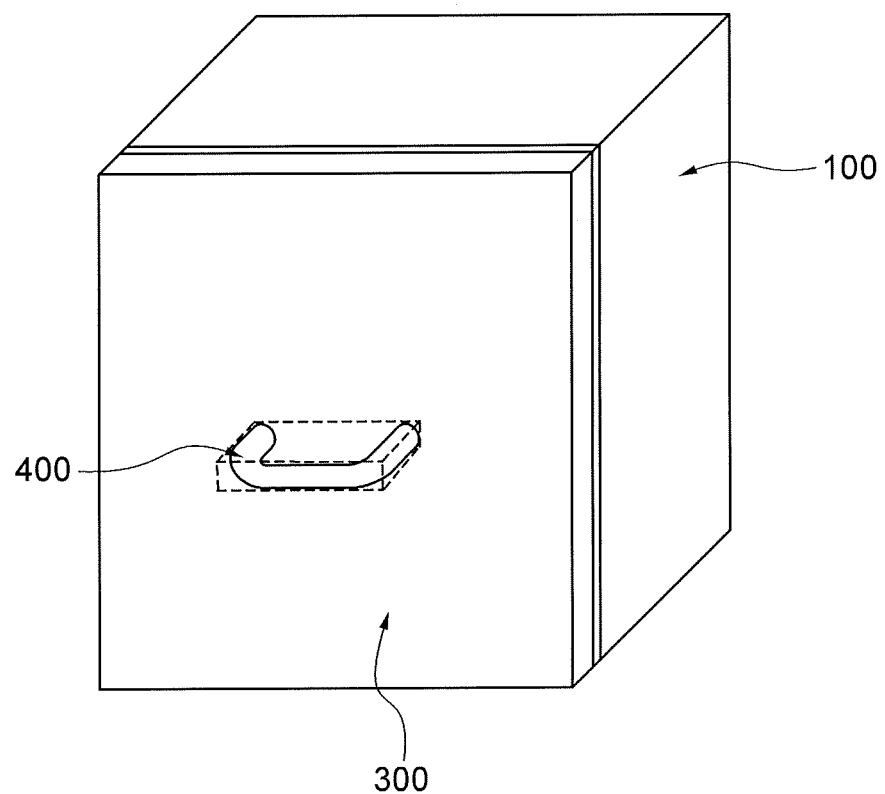
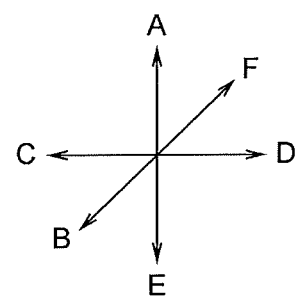

[FIG.22]
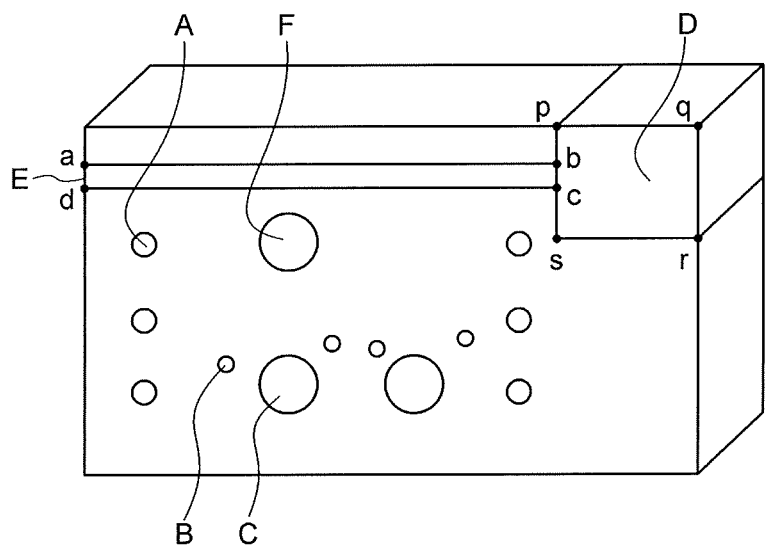
|   |   | FACTORY A | FACTORY B |
|---|---|---|---|
| A | 8mm DIAMETER | NC | NC |
| B | 5mm | CUP HOLE | NC |
| C | 30mm |  | NC |
| D | 70 × 20mm | CORNER CUT | CORNER CUT |
| E | 3mm × 6mm WIDTH  DEPTH | TENONER | NC |
| F | THROUGH  φ50mm HOLE | NC | NC |

[FIG.23]
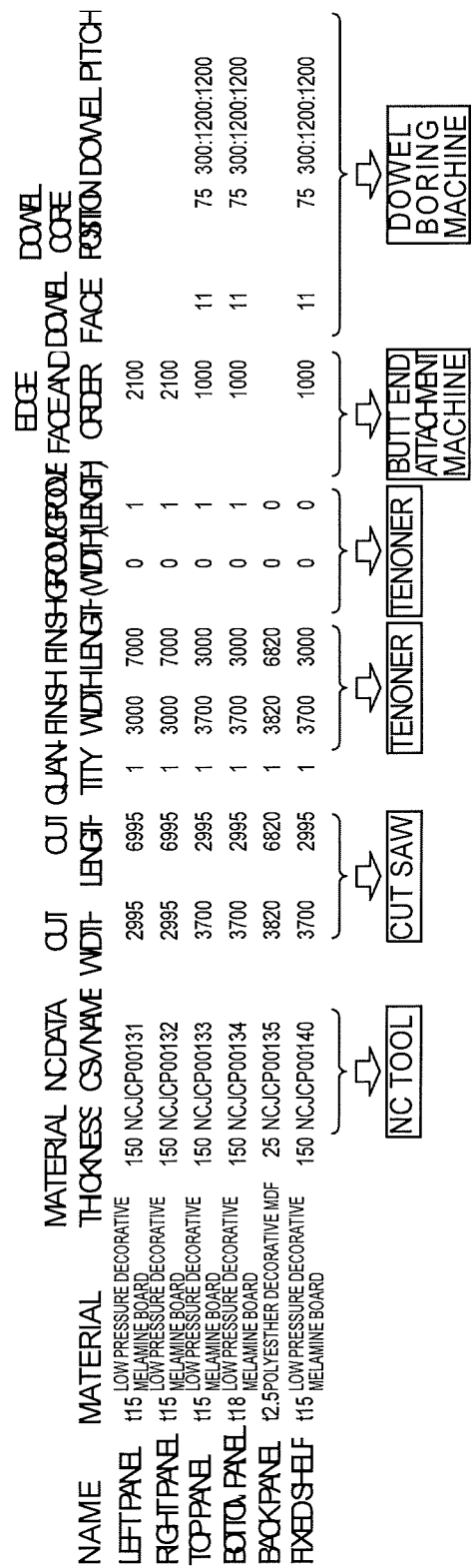

METHOD FOR DESIGNING AND MANUFACTURING CUSTOM-MADE FURNITURE USING COMPUTER, SYSTEM, AND PROGRAM THEREFOR

CROSS-REFERENCE TO RELATED APPLICATIONS

This application is a national stage of International Application PCT/JP17/03324, filed on 31 Jan. 2017 (pending), and which cites the priority of Japan Patent Application 2016-018216, filed on 2 Feb. 2016 (pending). All of the foregoing applications are incorporated herein by reference in their entireties.

FIELD OF INVENTION

Present invention relates to a method and a system for designing custom-made furniture using computer and program therefor.

BACKGROUND ART

As a measure to design a three-dimensional structure by using a computer, three-dimensional CAD has been used. By using three-dimensional CAD, furniture product can be three-dimensionally designed with desired dimensions and shape on a screen. Further, data of a furniture product designed by using three-dimensional CAD can be produced as NC data by using CAD/CAM so that members of the furniture product can be machined by using NC (numerical control) machining tools.

PRIOR ART REFERENCES

Patent Literature

JP Publication No. 2001-92865 A method for designing CAD drawing, apparatus, and a method of editing dimensions and apparatus and memory medium CANON KABUSHIKI KAISHA published on Apr. 6, 2001.

Non-Patent Literature

Development of CAPP system for composite machine tools Japan society of mechanical engineering (C) Vol 78 No. 791 (2012-7) Hamada et al Published on Mar. 24, 2012

Summary of Invention

Problem to be Solved by the Invention

Three-dimensional CAD is a convenient tool for freely and easily designing three-dimensional structure by using a PC. In three-dimensional CAD, three-dimensional structure is placed in a three-dimensional coordinate space on a PC screen. Corner, ridge line, and faces are depicted and calculated based on their XYZ coordinate position.

However, when a furniture product is formed of a plurality of members, three-dimensional CAD depicts size and shape of each member based on XYZ coordinate on a PC screen. In that case, information of one member does not contain the information of the connection with other member(s). Therefore, if a dimension or shape of one member is altered, the relationship of connection with other members surrounding that member needs to be searched, and structure and position of other member needs to be calculated and reset based on the result of the search.

Further, usually members of a furniture product are provided with various machinings such as holes, cuttings and/or grooves. A member of a furniture product is designed as a three-dimensional structure that is provided with such holes, cuttings and/or grooves by using three-dimensional CAD. In order to alter a dimension of the member, holes, cuttings and grooves of all of the members needs to be reset based on the alteration of the dimension of the member, even if that alternation of the dimension is quite small. If the number of members of a furniture product is many, volume of necessary work for resetting the dimensions of all members becomes quite large.

On the other hand, although three-dimensional CAD has a great advantage in that it can flexibly design a quite complex three-dimensional structure, kinds of machinings that are provided to the members of a furniture product, especially wood-made furniture product, is limited to the machinings that can be provided by a machining tools such as router, grooving machine, dowel driving machine. Therefore, the necessity to design complex structure that cannot be worked out by those machine tools is very small.

Under these circumstances, it has been difficult to alter dimension of furniture product designed by using three-dimensional CAD upon request from customer. Also, it was difficult to efficiently machine a number of members of a furniture product that was designed by using a three-dimensional CAD on a commercially payable basis.

Means to Solve the Problem

In order to solve above problem, the inventors of the present invention intensively researched and found that a furniture product which is formed of a number of members can be understood as a three-dimensional combination of a plurality of rectangular parallelepiped (space). More specifically, although shape of members of a furniture product is not necessarily rectangular parallelepiped, basic contour of the members can be regarded as rectangular parallelepiped, and machining such as cutting, grooving, and/or holes are provided to form the actual shape of the member. If the contours of the members are all simple rectangular parallelepiped, the furniture product formed of those members can also be understood as a three-dimensional structure formed of a plurality of simple rectangular parallelepiped.

If the structure of a furniture product is a combination of a plurality of simple rectangular parallelepiped, faces of each rectangular parallelepiped are in parallel or perpendicular to each other. Therefore, three-dimensional structure of the furniture product can be defined by 1) distance between the faces that are in parallel to each other, and 2) two dimensional positional relationship between the faces of rectangular parallel piped spaces that can be obtained by projecting a face of a rectangular parallelepiped to a face of another on a same plane. A furniture product can be designed based on the members defined as such and their positional relationship. Based on this finding, inventors of the present invention reached the following invention, According to an embodiment of the system/method of the present invention, a basic member such as panels that constitutes a furniture product is set as a "part member", and contour of part member is set as rectangular parallelepiped. By combining the part members, "unit" that performs a function of a furniture product is formed. Rectangular parallelepiped space that circumscribes a unit is set as a "unit space". Further, by combining a plurality of units, "a product" is formed. Rectangular parallelepiped space that circumscribes a unit is set as a "unit space". Based on the hierarchy of upper and lower of these spaces (part member→unit space→product space), a tree structure is set. In the tree, the position of a rectangular parallel piped space of lower position can be set based on the position of a rectangular parallel piped space of higher position.

According to an embodiment of the system/method of the present invention, if a furniture product is formed of a plurality of units and the part member (first part member) and another part member (second part member) belong to different units, positional relationship between the part member and another part member can be identified by going up to the furniture product space formed of the different units, i.e. route of first part member→first unit space→furniture product space→second unit space→second part member.

According to an embodiment of the system/method of the present invention, positional relationship between part member(s) and a unit space of the unit that is formed by the part member(s) can be set by determining a distance between a face of the unit space and a face of a part member that is in parallel with the face of the unit space. If a face of six faces of a unit space is moved in a direction perpendicular to the face in a state that the distance between a face of a unit space and a corresponding face of a part member is determined by unit/part member correlation, the face of the part member that is unit/face correlated with a face of the unit space thus moved moves in accordance with the movement of the face of the unit space.

According to an embodiment of the system/method of the present invention, positional relationship between part members can be set by determining the distance between a face of a part member and a face of another part member that is in parallel with the face of the part member. If a face of six faces of a part member is moved in a direction that is perpendicular to the face in a state that the distance between a face of the part member and a corresponding face of another part member is determined by part member correlation, the face of the part member that is part member face-correlated with a face of the part member moves in accordance with the movement of the face of the part member.

According to an embodiment of the system/method of the present invention, positional relationship between unit spaces can be set by providing unit space face-correlation that determines the distance between a face of a unit space and a face of another unit space that is in parallel with the face of the unit space. If a face of six faces of a unit space is moved in a direction that is perpendicular to the face in a state that the distance between a face of the unit space and a corresponding face of another unit space by unit space face-correlation, the face of the unit space that is unit space correlated with a face of the unit space moves in accordance with the movement of the face of the unit space.

According to an embodiment of the system/method of the present invention, a position that is designated by XY coordinate of a face of a part member is coordinate converted into a position that is designated by XY coordinate of a face of another part member.

Preferably, the first part member and the second part member are located on a screen such that the first face of the first part member faces the second face of the second part member perpendicularly to each other. XY coordinate is set such that a corner of a rectangular of each of the faces of the first part member and the second part member is set as an origin and two sides of the rectangular perpendicularly extends in X and Y direction from the origin, and the first position is designated by the XY coordinate of the first face of the first part member. By perpendicularly projecting the first face of the first part member onto the second face of the second part member, two dimensional positional relationship between the first face and the second face is calculated. Based on the two dimensional positional relationship between the first face and the second face, a position on the second face that corresponds to the first position that is designated by XY coordinate of the face of the first part member is described by using the XY coordinate of the second face.

If a part member and another part member form a unit, three-dimensional positional relationship between each part member and a unit space of the unit is determined based on the unit space. Based on the positional relationship between the unit space and each part member, a position that is designated by XY coordinate of a face of a part member is perpendicularly projected onto a face of another part member that is in parallel with the face of the part member. By projecting the face of the part member onto a face of another part member, a position that is designated on the face of the part member is described by the XY coordinate of the face of another part member. Under these settings, if a position for inputting a machining that is designated by XY coordinate on the face of the former part member is changed, the position on a face of another part member for inputting machining is changed accordingly.

If the part member and another part member belong to different units, positional relationship between the part member and the another part member can be calculated by going up to a furniture product space that is formed by the different units. Based on the calculated positional relationship, XY coordinate is converted between two faces of a part member and another part member. As a result, it becomes possible to change the position for inputting machining on the face of a part member in accordance with the change of the position of machining of another part member that belongs to a different unit from that of the part member.

Preferably, if a width and depth of a rectangular face of the rectangular parallel piped of a part member are set as p and q respectively, XY coordinate position on the rectangular face to input machining can be set as a function of p and/or q ($f(p)$, $f(q)$) in the XY coordinate in which a corner of the rectangular is set as an origin and two sides which extend from the origin are set as X axis and Y axis. Under these settings, if a dimension of the rectangular parallel piped is altered, value of p and/or q is changed and the XY coordinate position of inputting a machining on the six faces of each part member is changed in accordance with the alteration of the dimensions of the rectangular parallel piped of the part member.

According to an embodiment of the system/method of the present invention, if a part member is a panel and the panel is composed of a core component, butt end sheet attached to a butt end of the core component and surface sheet attached to a surface of the core component, rectangular parallel piped of the part member can be divided into butt end space, surface sheet space, and core component space. Butt end space, surface sheet space, and core component space are all positioned at the lowest position in the aforementioned tree structure of furniture members.

Preferably, thickness of butt end sheet and surface sheet is set as a fixed value, and thickness of core component is set as changeable value. By making the settings in this manner, it becomes possible to change the dimensions of a part member such that only thickness of the core component is changed while thickness of butt end sheet and surface sheet is not changed.

In order to set core component space, butt end space, and surface sheet space with a part member, it is also possible to constitute a part member by attaching a butt end space and surface space to a core component space having changeable dimension so that sum of the dimensions of the core component space, butt end component space, and surface component space becomes the dimension of the part member. In that case, the relationship between the part member, core component space, butt end sheet space, and surface sheet space is the same as that of the relationship set by dividing part member into butt end space, and surface sheet space and core component space.

According to an embodiment of the system/method of the present invention, data of a machining may be input only to a face of a part member and do not need to be input to butt end sheet space nor surface sheet space. This is because object of machining is a part member. Surface sheet, butt end sheet, core component are machined as a result of machining the part member. Therefore, there is no need to provide machinings to surface sheet, butt end sheet, core component.

Advantage of the Invention

By using the system/method of an embodiment of the present invention, it becomes possible to design a furniture product as a combination of simple rectangular parallel piped and a machining that is registered on a face of the rectangular parallel piped. Therefore, the furniture product can be easily designed even if a furniture product is formed of many members having various dimensions, and dimensions of the product can be freely altered in response to a request from customer, and machinings can be applied to the altered product.

By using the system/method of an embodiment of the present invention, it becomes possible to easily calculate the relationship of the positions of machinings that are provided to a plurality of part members even when the plurality of part members belong to different unit by using the computer system of the invention. As a result, when an alteration of a dimension is input to a part member, change of the position of machining of another part member can be automatically calculated and output. Therefore, it is not necessary to input change of the position of machining to another part member when a dimension of the part member is altered.

By using the system/method of an embodiment of the present invention, it becomes possible to automatically produce bill of materials (BOM) and machining specification of all members that constitute a furniture product including minimum constituents such as surface sheet, butt end sheet, and core component, and output to a furniture production factory.

BRIEF EXPLANATION OF DRAWINGS

FIG. 1 shows a whole configuration of the system for designing, receiving an order of, and placing a production-order of the custom-made furniture product which is one embodiment of the present invention, FIG. 2 shows an internal structure of the design system 1 for custom-made furniture product which is one embodiment of the present invention.

FIG. 3(A) shows an example of a PC screen of a unit designing system, which is one embodiment of the present invention. FIG. 3(B) shows an example of a PC screen of a unit designing system, which is one embodiment of the present invention.

FIG. 4(A) is an example of an embodiment of the present invention, which shows dividing rectangular parallel piped of a part member into butt end sheet space, surface sheet space, and core component space. FIG. 4(B) shows an example of dividing rectangular parallel piped of a part member into butt end sheet space, surface sheet space, and core component space which is one embodiment of the present invention. FIG. 4(C) shows an example of dividing rectangular parallel piped of a part member into butt end sheet space, surface sheet space, and core component space which is one embodiment of the present invention.

FIG. 5(A) shows an example of part member face-correlation between two part members and setting a unit space. FIG. 5(B) shows a drawing viewing the position of dowel in xy coordinate on a top panel 104 of FIG. 5(A) from c direction. FIG. 5(C) shows a drawing which express the position of dowel on a top panel 104C by using the XY coordinate set on a left side face 102D of the panel 102.

FIG. 6 shows a bookshelf designed by using a system of the present invention.

FIG. 7(A) shows a cabinet 100 of the bookshelf of FIG. 6. FIG. 7(B) shows the position of a dowel hole provided on a face of 104C of the top panel 104 of the cabinet 100. FIG. 7(C) shows a position of a dowel hole expressed by xy coordinate on 102D that is provided by transferring the dowel hole on 104(C) to 102(D).

FIG. 8 shows an example of part member face-correlation provided between part members of the cabinet of FIG. 7.

FIG. 9 shows unit space/part member face-correlation provided between six faces of a unit space of the cabinet 100 of FIG. 7 and faces of part members.

FIG. 10(A) shows an example of dowel boring machining on a left side panel 102 based on the position of a shelf panel 106 of FIG. 6. FIG. 10(B) shows reference positions virtually set by using XY coordinate on a face 106C of the shelf panel to provide dowel holes on a face 102D of the left side panel of FIG. 10(A). FIG. 10(C) shows a drawing in which XY coordinate on the face 102D is used to express positions of dowel holes provided on the face 102D based on the reference positions virtually set by using XY coordinate on the face 106C of the shelf panel of FIG. 10(B).

FIG. 11 shows a change of the position of dowel holes caused by a change of the position of a movable shelf of the bookshelf of FIG. 6.

FIG. 12 shows a change of the position of dowel holes caused by a change of the dimension of the bookshelf of FIG. 6.

FIG. 13 shows a change of the position of dowel holes caused by a change of the position of the movable shelf of the bookshelf of FIG. 6.

FIG. 14 shows an example of bill of materials (BOM) data of the bookshelf of FIG. 6 designed by using the system of an embodiment of the present invention FIG. 15(A) shows an example of machining specification provided on a face of a part member of the cabinet of the bookshelf of FIG. 6 designed by using the system of an embodiment of the present invention. FIG. 15(B) shows machining specification of a case where the height of the bookshelf of FIG. 6 designed by using the system of an embodiment of the present invention is lowered by 10 mm. FIG. 15(C) shows machining specification of a case where the height of the movable shelf panel of the bookshelf of FIG. 6 designed by using the system of an embodiment of the present invention is lowered by 10 mm.

FIG. 16(A) shows a plan view of the bookshelf of FIG. 6 designed by using the system of an embodiment of the present invention. FIG. 16(B) shows a front view of the bookshelf of FIG. 6 designed by using the system of an embodiment of the present invention. FIG. 16(C) shows a right side view of the bookshelf of FIG. 6 designed by using the system of an embodiment of the present invention.

FIG. 17(A) is a front view, plan view, and side view of a right side panel of the bookshelf of FIG. 6 designed by using the system of the embodiment. FIG. 17(B) is a front view, plan view, and side view of a left side panel of the bookshelf of FIG. 6 designed by using the system of the embodiment. FIG. 17(C) is a front view, plan view, and side view of a top panel of the bookshelf of FIG. 6 designed by using the system of the embodiment. FIG. 17(D) is a front view, plan view, and side view of a back panel of the bookshelf of FIG. 6 designed by using the system of the embodiment. FIG. 17(E) is a front view, plan view, and side view of a bottom panel of the bookshelf of FIG. 6 designed by using the system of the embodiment. FIG. 17(F) is a front view, plan view, and side view of a shelf panel 106 of the bookshelf of FIG. 6 designed by using the system of the embodiment.

FIG. 18 shows an example of master data of prices and time required for the procurement of members used in the furniture product designed by using the system of an embodiment of the present invention.

FIG. 19 shows a flow of designing, receiving order of, and ordering production of custom-made furniture by using the system of an embodiment of the present invention.

FIG. 20(A) shows an embodiment of a storage case with drawer designed by using the system of the present invention. FIG. 20(B) shows an embodiment of a drawer inner box of the storage case with drawer designed by using the system of the present invention.

FIG. 21 shows an embodiment of a storage case with door designed by using the system of the present invention.

FIG. 22 shows an example of machinings provided on a member of the furniture designed by using the system of an embodiment of the present invention.

FIG. 23 shows an example of machining data in an embodiment of the present invention.

DESCRIPTION OF EMBODIMENTS

Hereinafter, embodiments of the present invention are explained in detail with references to the drawings. Terms used to explain the embodiments of the present invention are explained in detail.
<Furniture>

"Furniture" in an embodiment of the present invention broadly refers to housing facility such as a storage shelf, a kitchen cabinet, a unit bath, etc. A part member of a furniture product is usually made of wood, but it is not limited to any particular material. Plastics, metal, stone, marble, or glass may also be used.
<Unit Designing System>

"Unit designing system" in an embodiment of the present invention refers to a tool that constitutes a part of the system of the invention. The unit designing system produces part members of a furniture product, inputs machining information to a position designated by XY coordinate of rectangles of six faces of the part member, and produces a unit from the part member(s) to which machining information is input.
<Unit Assembly System>

"Unit assembly system" in an embodiment of the present invention refers to a tool for producing a furniture product by combining units produced by the unit designing system. The unit assembly system moves positions of unit spaces on a screen, combines the units, and alters dimensions so as to design a furniture product having dimensions and a shape that are desired by a customer, and assigns a product number to the furniture product, and outputs BOM data and machining specification data of members of the furniture product.
<Part Member>

"Part member" in an embodiment of the present invention refers to a basic member such as a panel, which constitutes a furniture product. In an embodiment of the present invention, contour of all part members are rectangular parallelepiped, and machinings such as holes, grooving, and/or cutting are provided on the rectangular parallelepiped contour to form the actual shape. In an embodiment of the present invention, a part member is prepared as a rectangular parallelepiped space on a PC screen. The length, width and thickness of the rectangular parallelepiped of a part member are set by the distances in X, Y, and Z directions from the origin of XYZ coordinate (local coordinate) set on a PC screen. Each dimension of a part member is set as a changeable or fixed value. Since the thickness of a panel is usually constant, the values in the lengthwise and widthwise direction are set as changeable values, and the value in the thickness direction is set as a fixed value. A selected machining is registered on a position designated by XY coordinate set on each of the six faces of the rectangular parallelepiped.
<Attachment>

"Attachment" in the embodiment of the present invention refers to a component such as a dowel and/or a screw, which is used as an attachment of a part member of a furniture product. The size of an attachment such as a dowel or a screw is defined by a standard specification, and therefore does not need to be selected or changed according to the dimension of a part member. Hence, there is usually no setting of a parallelepiped space required for the attachment, and a dowel or screw of a certain standard is registered in master data of a memory to be registered on a designated position on a face of a part member. The attachment registered on a face of a part member is output on the bill of materials (BOM), together with data on the part member.
<Part Member Fittings>

In an embodiment of the present invention, components such as a hinge fitting, a handle of a door, and rails of a drawer are fittings of a part member that are attached on a part member of a furniture product. These fittings of a part member are designed in the same manner as a part member, and their minimum three-dimensional circumscribing parallelepiped space is set as a contour of the fittings of the part member. Although shapes of the fittings such as a hinge, a handle of a door, and rails of a drawer are not rectangular parallelepiped, their contours are set as rectangular parallelepiped, and the actual shape is formed by providing machinings such as cutting, notching, and holes to the rectangular parallelepiped.

The number and size of hinge fitting(s), handle(s) of a drawer, and rail(s) of a drawer need to be selected and/or changed in accordance with the dimension of a part member. Therefore, a circumscribing parallelepiped space is set for each of the components such as a hinge fitting, a handle of a drawer, and rails of a drawer, so that the length, width and thickness of the rectangular parallelepiped can be changed by altering dimensions in X, Y, and Z directions on a PC screen. If necessary, a hinge fitting, a handle of a door, or rails of a drawer may be set as an attachment such as a dowel or a screw, instead of as a part member. Conversely, a dowel or screw may be handled as a fitting for a part member, and their dimension may be selected or altered by setting a circumscribing parallelepiped space thereof.

<Unit>

"Unit" in an embodiment of the present invention refers to a three-dimensional structure that forms a unit of a product. A plurality of part members may be combined to form a unit. Or a single part member may be set as a single unit. In the embodiment of the present invention, what to set as a part member, unit, or a combination of units in a product formed of a combination of part members, is a design matter left to the designer. Depending on the circumstances, designer can design a member as a part of another three-dimensional structure, or design the member to be detachably located from the unit.

In the embodiment of the present invention, designer can arbitrarily determine, as needed, what is set as a unit or a combination of units in a three-dimensional structure formed of a combination of a plurality of part members. In the example of FIG. 6 of a cabinet 100, a housing formed of part members, i.e., five panels including right and left side panels, a bottom panel, a top panel, and a back panel is set as a unit, and a shelf panel 106 is set as another single unit formed of a single part member. It is also possible to set the shelf panel 106 as one of the part members constituting the cabinet 100, like other part members such as the side panel, top panel, bottom panel, and back panel. If the shelf panel 106 is stored in a detachable manner in the cabinet 100 by using dowels, it is advantageous and desirable to set the shelf panel 106 as a single unit formed of a single part member. In the case of a storage case with door in FIG. 21, it is possible to set each of a cabinet, door, and handle of door as a unit, or to set each of the door and handle as a part member and set a combination of the door and handle as a unit of door-with-handle.

<Skeleton Unit, Infill Unit>

"Skeleton unit" in an embodiment of the present invention refers to a unit that has a space capable of entirely or partially accommodate another unit (infill unit). "Infill unit" in an embodiment of the present invention refers to a unit that is entirely or partially accommodated in an internal space (cell space) of another unit (skeleton unit). For example, in a cabinet with drawer of FIG. 20, a cabinet formed of a combination of part members is a skeleton unit, and a drawer also formed of a combination of part members is an infill unit on a screen of the system of the present invention. Since the skeleton unit and the infill unit are separate units to each other, a dimensional alteration of one unit does not lead to a dimensional alteration of the other unit. However, by face-correlating the units through a cell space (to be described later), a dimensional alteration of one unit can alter the dimension of the other unit.

<Circumscribing Parallelepiped Space>

"Circumscribing parallelepiped space" in an embodiment of the present invention refers to a virtual three-dimensional rectangular parallelepiped space that circumscribes a three-dimensional structure. For example, if a three-dimensional structure is a rectangular parallelepiped panel having dimensions of a length of 300 mm, a width of 500 mm, and a thickness of 20 mm, a space having the dimension of the contour of the panel is the circumscribing parallelepiped space of this three-dimensional structure. In the case of a three-dimensional structure such as a hinge fitting that is not rectangular parallelepiped, the minimum rectangular parallelepiped space that can accommodate the fitting is the circumscribing parallelepiped space of this three-dimensional structure. In a three-dimensional structure shown in FIG. 5 in which two panels of a side panel and a top panel are connected perpendicularly to each other, a space indicated by broken lines is the circumscribing parallelepiped space of a three-dimensional structure formed of the two part members, i.e. side panel and top panel.

<Unit Space>

"Unit space" in an embodiment of the present invention refers to a virtual three-dimensional rectangular parallelepiped space that circumscribes a unit. When a plurality of part members are combined to form a unit on a screen of the system of the present invention, a space that circumscribes and accommodates the unit is regarded as a "unit space" of the unit. By setting the virtual three-dimensional rectangular parallelepiped space circumscribing the unit as a unit space, a position of a part member that belongs to the unit can be easily calculated and/or set in the positional relationship relative to the unit space. Usually, a three-dimensional rectangular parallelepiped space that circumscribes a unit is set as a unit space. However, if necessary, it is possible to set a unit space by reducing or enlarging the three-dimensional rectangular parallelepiped space that circumscribes the unit.

Preferably, in an embodiment of the present invention, a dimension of a part member is altered by altering a dimension of a unit space of a unit that includes the part member. If the dimension of the unit space is altered, the dimension of part member(s) that are unit space/part member face-correlated with six faces of the unit space is altered accordingly. Further, by providing unit space face-correlation between six faces of one unit space and six faces of another unit space, it becomes possible to alter the dimension of the other unit space by altering the dimension of the one unit space. As a result, it becomes possible to alter the dimensions of a unit constituting a unit space and part members constituting the unit altogether.

When a unit is formed of a plurality of part members, the position of each part member constituting the unit can be set based on a unit space by using a distance between each of six faces of the unit space and a face of a part member that is in parallel with the face of the unit space. Once the position of a part member is fixed based on the unit space, the dimensions and position of the part member can be changed in accordance with a change of the dimensions and position of the unit space.

<Cell Space>

"Cell space" in an embodiment of the present invention refers to a space that can inscribe and accommodate all or a part of an infill unit inside a skeleton unit. By setting a "cell space" in an internal space surrounded by part members of the skeleton unit, a unit space of the infill unit can be inscribed and accommodated in the cell space. A position of the infill unit inscribed and accommodated in the cell space can be set based on the cell space by using a distance between each of six faces of the cell space and each of six faces of the unit space of the infill unit that is in parallel with the respective six faces of the cell space.

In the example shown in FIG. 6, the shelf panel 106 is set as an individual unit formed of a part member. Therefore, the cabinet 100 (combination of a plurality of part members) and the shelf panel 106 are separate units. If part members 101, 102, 103, 104 and 105 constituting the cabinet 100 are not part member face-correlated with the shelf panel 106, an alteration of a dimension of any of the part members 101, 102, 103, 104 and 105 does not lead to an alteration of a dimension of the shelf panel 106, and vice versa. However, when the shelf panel is accommodated in the cabinet, and reduction of the dimension of the cabinet is input, the dimension of the shelf panel needs to be reduced accordingly. Otherwise the shelf panel, can no longer be accommodated in the cabinet. Hence, by correlating the cabinet and the shelf panel with the same space, a change of the commonly correlated space can change the cabinet and the shelf panel in accordance with the change of the commonly correlated space. By setting a cell space P surrounded by panels of the cabinet, and face-correlating faces of a unit space of the shelf panel with a face of the cell space P, it becomes possible to alter dimensions of the cabinet and the shelf panel can be altered accordingly.

<Composite Panel>

"Composite panel" in an embodiment of the present invention refers to a panel formed from a combination of surface sheets such as a poly plywood attached to surfaces of a core component and, butt end sheets such as a tape attached to butt end sections of the core component, as exemplarily shown in FIG. 4(A). "Composite panel" is a part member that has a rectangular parallelepiped contour.

<Surface Sheet Space, Butt End Space, Core Component Space>

"Surface sheet space" in an embodiment of the present invention refers to a rectangular parallelepiped space formed by dividing rectangular parallelepiped of a composite panel (part member) into the dimension of a surface sheet attached to a core component. "Butt end space" refers to a rectangular parallelepiped space formed by dividing the composite panel as a part member into the dimension of a butt end sheet attached to the core component. "Core component space" refers to a rectangular parallelepiped space left as a core component, when the surface sheet space and the butt end space are divided from the composite panel as a part member.

Referring to FIGS. 4(A) to 4(C), a composite panel as a part member is explained by using the unit designing system. In FIG. 4(A), initial dimensions of the composite panel as a part member are 300 mm in depth and 15 mm in thickness, while the thickness of each of the butt end sheet and the surface sheet is set to be 1 mm. The composite panel may be changed so that the butt end sheet is not attached to an end face on the far side as shown in FIG. 4(B). This change can be made easily by changing the thickness of a butt end space of the end face on the far side to zero. In this case, since the depth of a space of the composite panel as a part member is set to be 300 mm, the depth (298 mm) of the core component and surface sheet is enlarged by the eliminated thickness (1 mm) of the butt end sheet, and is changed to be 299 mm.

The composite panel as a part member in FIG. 4(A) may be changed so that no surface sheet is attached to the upper surface as in FIG. 4(C). This change can be made easily by changing the thickness of the surface sheet on the upper surface to zero. In this case, since the thickness of the composite panel is set to a fixed value of 15 mm by face-correlation, the thickness (13.0 mm) of the core component is enlarged by the eliminated thickness (1.0 mm) of the upper surface sheet, and is changed to 14.0 mm.

<Product>

"Product" in an embodiment of the present invention may refer to a furniture product produced by combining a plurality of units on a screen of the system of the present invention. A product number is assigned to a product designed by using the system of the present invention. The same product number is assigned to the units that constitute a product, part members that constitute the units, and a surface sheet, a butt end sheet, and a core component that constitute the part members.

<Product Space>

"Product space" in an embodiment of the present invention refers to a virtual three-dimensional rectangular parallelepiped space that circumscribes a product formed of unit space(s). The position of a unit space of each unit constituting a product can be set based on a product space by using a distance between a face of the product space and a corresponding face of a unit space.

<Unit Space/Part Member Face-Correlation>

"Unit space/part member face-correlation" in an embodiment of the present invention refers to correlating a face of a part member constituting a unit with a parallel and corresponding face of a unit space of the unit by fixing a distance therebetween. The unit space/part member face-correlation between the face of the unit space and the face of the part member constituting the unit allows the dimension of the part member to be altered following input of an alteration of a dimension of the unit space, based on settings of the unit space/part member face-correlation.

<Part Member Face-Correlation>

"Part member face-correlation" in an embodiment of the present invention refers to correlating a face of a part member space with a face of another part member space by fixing a distance therebetween. If the distance is zero, both faces are on a same plane. In the event that a unit is formed of a plurality of part members by providing part member face correlation between parallel two faces of the part members, it becomes possible to alter dimensions of another part member in accordance with the alteration of a dimension of a part member.

Operation relationship between unit space/part member face-correlation and part member face-correlation is explained with reference to FIG. 5. In this case, a panel 104 (20 mm in thickness, 300 mm in vertical length, 500 mm in lateral length) is joined to a panel 102 (500 mm in height, 300 mm in depth, 30 mm in thickness). While the height of 500 mm and the depth of 300 mm of the panel 102 and the vertical length of 300 mm and the lateral length of 500 mm of the panel 104 are changeable, the thickness of 30 mm of the panel 102 and the thickness of 20 mm of the panel 104 are set as fixed values.

First, part member face-correlation is provided between the panel 102 as a part member and the panel 104 as a part member. The distance between parallel faces 102A and 104A, 102B and 104B, and 102F and 104F are all set to be zero. The distance between the face 102D and the face 104C is set to 0.5 mm. A three-dimensional structure formed of a part member 102 and a part member 104 is referred to as a unit A.

Then, a circumscribing parallelepiped space (indicated by broken lines) that circumscribes both the part member 102 and the part member 104 is set as a unit space, and unit/part face-correlation is provided between six faces (A, B, C, D, E, F) of the unit space of the unit A and the part member 102 constituting the unit A.

(1) The upper face (face A) of the unit space and the face 102A are in parallel to each other and the distance between the faces is zero. (2) The front face (face B) of the unit space and the face 102B are in parallel to each other and the distance between the faces is zero. (3) The left side face (face C) of the unit space and the face 102C are in parallel to each other and distance between the faces is zero. (4) the right side face (face D) of the unit space and the face 104D are in parallel to each other and the distance between the faces is zero. (5) The lower face (face E) of the unit space and the face 102E are in parallel to each other and the distance between the faces is zero. (6) The back face (face F) of the unit space and the face 102F are in parallel to each other and the distance between the faces is zero.

When the front face (face B) of the unit space is moved to the near side (arrow B direction) after providing part member face-correlation and unit space/part member face-correlation as explained above, the face 102B that is unit space/part member face-correlated with the front face (face B) of the unit space moves accordingly. Since it is determined by part member face-correlation that the faces 102B and 104B are in parallel to each other and the distance therebetween is zero, movement of the face 102B to the near side (direction B) also moves the face 104B to the near side (direction B) together with the face 102B according to the conditions set in the part member face-correlation. Thus, by moving the front face B of the unit space to the near side, it is possible to move both the faces 102B and 104B to the near side in a linked manner.

When the right face (face D) of the unit space is moved 10 mm to the right (arrow D direction), the face 104D that is unit space/part member face-correlated with the face (face D) of the unit space accordingly moves to the right. Since the lateral length of 500 mm of the panel 104 is set as a changeable value, the lateral length of 500 mm of the panel 104 (part member) is increased by 10 mm and reaches 510 mm.

When the left face (face C) of the unit space is moved by 10 mm to the left (arrow C direction), the face 102C that is unit space/part member face-correlated with the left face (face C) of the unit space accordingly moves to the left. Since the thickness of the panel 102 is fixed to be 30 mm, movement of the face 102C 10 mm to the left also moves the face 102D, which is a face opposite to the face 102C, 10 mm to the left. Since the faces 102D and 104C are part member face-correlated with a 0.5 mm distance therebetween, if the face 102D is moved by 10 mm to the left, the face 104C is moved to the left by 10 mm. Since the lateral length of the panel 104 (part member) is set as a changeable value, the movement of the face 104C by 10 mm to the left increases the length of the panel 104 (part member) by 10 mm so that the length of the panel 104 becomes 510 mm. Because the face 104D is not face-correlated with any of the face C of the unit space, the face 102C, or the face 102D, position of the face 104D is not changed.

When the upper face (face A) of the unit space is moved by 10 mm upward (arrow A direction), the face 102A that is unit space/part member face-correlated with the face A of the unit space moves 10 mm upward (arrow A direction). Since the faces 102A and 104A are part member face-correlated with zero distance therebetween, movement of the face 102A 10 mm upward (arrow A direction) accordingly moves the face 104A 10 mm upward (arrow A direction). Since the thickness of the panel 104 is fixed to 30 mm, upward movement of the face 104A also moves the face 104E, which is a face opposite to the face 104A, 10 mm upward (arrow A direction).

When the lower face (face E) of the unit space is moved 10 mm downward (arrow E direction), the face 102E that is unit space/part member face-correlated with the face E of the unit space moves 10 mm downward (arrow E direction). The faces 102E and 104E are in parallel with each other but are not part member face-correlated. Hence, even when the face 102E moves downward, the face 104E does not move downward accordingly.

<Unit Space Face-Correlation>

"Unit space face-correlation" in an embodiment of the present invention refers to, when a product is formed of a plurality of units, setting a positional relationship between a face of six faces of a unit space of one unit and a parallel and corresponding face of a unit space of another unit by determining the distance between the two faces. If the face-correlated one face of the one unit space is moved in a direction that is perpendicular to the one face in a state that the faces of the two unit spaces are unit space face-correlated, the face of the other unit space that is unit space face-correlated with the one face moves according to a relationship determined by the unit space face-correlation.

<Cell Space/Unit Space Face-Correlation>

"Cell space/unit space face-correlation" in an embodiment of the present invention refers to face-correlating a face of a cell space of a skeleton unit with a parallel and corresponding face of a unit space of an infill unit accommodated in the cell space by determining the distance between the faces. If an infill unit is accommodated in a cell space of a skeleton unit, the distance between a face of the unit space of the infill unit and a face of the cell space that is in parallel with the face of the unit space is determined. As a result, it becomes possible to alter dimensions of a part member of the skeleton unit and a dimension of a part member of the infill unit via the unit space of the infill unit. Cell space/unit space face-correlation and unit space face-correlation are basically the same, except the difference of space of face-correlation, i.e. unit space or cell space.

<Machining>

"Machining" in an embodiment of the present invention refers to machinings such as holes, cuttings, and/or grooves provided to part members. In an embodiment of the present invention, the contour of all part members are rectangular parallelepiped, and machinings such as holes, grooving, and/or cutting are provided on the rectangular parallelepiped contour to form the actual shape. In the design system of an embodiment of the present invention, a specific machining is selected from machining master data registered in a memory, and the selected machining is registered on a position designated by XY coordinate on a face of a part member.

<Machining Position>

"Machining position" in an embodiment of the present invention refers to a position on a face of the rectangular parallelepiped of a part member, where a machining selected by using the system of the present invention is input. A machining position is designated by XY coordinate of a rectangle of the face on which the machining is provided. Referring to FIG. 22, the center of a hole of each of A, B, C, and F is a machining position, and the size of the hole is determined by the diameter from the center. As for a groove E, four points a, b, c, and d surrounding a rectangle of the lateral length of the groove are specified as machining positions. As for a cutting D, four points p, q, r, and s surrounding a rectangle on a front face of a corner cut out of a panel to be machined are specified as machining positions. The information on these machining positions is the minimum information required to determine positions for machining tools to provide machinings such as holes, grooves, and/or cuttings on the machining targets. Upon receiving the above-described positional information together with other necessary information (e.g., depth of a hole or groove), a machining tool can provide machinings on a part member.

<Machining Tool>

"Machining tool" in an embodiment of the present invention refers to an apparatus, such as a dowel boring machine, a tenoner, and a cut saw, used by a manufacturer of a furniture product to provide machinings on members of the furniture product. Preferably, BOM data and machining specification data output from the system of the present invention are coded to be readable by a machining tool in a production factory.

BOM data and machining specification data output from the system of the present invention include information of the machining target (e.g., panel) and details of the machining to be provided on the machining target, and information of the position to provide machining. A production factory that receives the data output from the system of the present invention uses the data of the bill of materials and machining specification to select the type of machining tool to be used for machining and the way of machining depending on the capacity of the machining tool in the factory, and provides machining on the panel.

Referring to FIG. 22, three holes A each having an 8 mm diameter are formed on a vertical line by using an NC (drill), on a part of a panel where its thickness, width, and vertical length are constant. Reference signs B, C indicate cup holes for attaching fittings. While cup holes are often formed by using a dedicated cup hole machining tool, it can also be formed by a drill of a typical NC tool. Reference sign D indicates a cutting provided on the right upper corner of the panel, which can be formed by using a corner cutter. Reference sign E indicates a groove formed with a 3 mm width and a 6 mm depth in the longer lateral direction of the panel, which and can be formed by using a tenoner. Reference sign F indicates a through hole having a 50 mm diameter, which can be formed by using a drill of an NC tool.

Machining factories that machine the panel may or may not have the same machining tools. In FIG. 22, factories A and B can use the same machining tools (NC drill, corner cutter) to form holes A, F and cutting D on the panel. Meanwhile, as for the groove E, factory A has a tenoner and can use it for machining, but factory B does not, and therefore uses an NC drill instead.

Preferably, BOM data and machining specification data output from the system of the present invention provides information on the machining target (e.g., panel) and types/details of the machining to be provided on the machining target, and information on the position to provide machining in a standardized format readable by machining tools. FIG. 23 shows an example of a format of BOM data and machining specification data provided to a machining tool from the system of the present invention. A production factory receives data in a standardized format from the system of the present invention and reads the data with its machining tool, so that it can machine and manufacture members of a furniture product based on the BOM data and the machining specification data.

<Coordinate Conversion>

"Coordinate conversion" in an embodiment of the present invention refers to converting a position designated by XY coordinate on one face of one rectangular parallelepiped into a position designated by XY coordinate on a face of another rectangular parallelepiped that is in parallel with the one face.

Referring to FIG. 5(A), the left side face 104C of the top panel 104 is joined and fixed to the inner side face 102D of the left side panel 102 with dowels. When the top panel 104 is perpendicularly joined to the left side panel 102, the positional relationship between the top panel 104 and the left side panel 102 is defined by the distances between six faces of a virtual rectangular parallelepiped space (unit space indicated by broken lines) circumscribing the top panel 104 and the left side panel 102, and faces of the top panel 104 as well as faces of the left side panel 102.

In FIG. 5(A), the relationship between the left side panel 102 and the unit space is set such that: the face 102A is in parallel with the upper face of the unit space and the distance therebetween is zero; the face 102B is in parallel with the front face of the unit space and the distance therebetween is zero; the face 102C is in parallel with the left face of the unit space and the distance therebetween is zero; and the face 102D is a face opposite to the face 102C and the thickness of the left side panel 102 is fixed to 30 mm. The face 102E is in parallel with the lower face of the unit space and the distance therebetween is zero; and the face 102F is in parallel with the back face of the unit space and the distance therebetween is zero.

Similarly, in FIG. 5(A), the relationship between the top panel 104 and the unit space is set such that: the face 104A is in parallel with the upper face of the unit space and the distance therebetween is zero; the face 104B is in parallel with the front face of the unit space and the distance therebetween is zero; the face 104C is distant from the left face of the unit space by the thickness of the left side panel 102 plus 0.5 mm; the face 104D is in parallel with the right face of the unit space and the distance therebetween is zero; the face 104E is a face opposite to the face 104A and the thickness of the top panel 104 is fixed to 30 mm; and the face 104F is in parallel with the back face of the unit face and the distance therebetween is zero.

Positions of dowel holes a, b registered on the left side face 104C of the top panel 104 are designated by XY coordinate with the origin located at the left near side-lower corner of a rectangle of the face 104C. In the example of FIG. 5(B), XY coordinate of the dowel hole a is (100 mm, 10 mm), and the coordinate of the dowel hole b is (200 mm, 10 mm). Assuming that a' and b' denote the XY coordinate of two dowel holes provided on the inner side face 102D of the left side panel 102 corresponding to centers a (100 mm, 10 mm) and b (200 mm, 10 mm) of the two dowel holes registered on the left side face 104C of the top panel 104 when the top panel 104 is joined to the right side panel 102, the XY coordinate of a' and the XY coordinate of b' on the face 102D of the left side panel 102 are calculated to be a'(100 mm, 490 mm) and b'(200 mm, 490 mm) based on the positional relationship between the top panel 104 and the left side panel 102.

Embodiment

Hereinafter, embodiments of the present invention are explained in detail.

The system in the present invention may work as an application software which works on the operation system such as Windows (registered trademark). The application programming interface such as OpenGL(registered trademark) is preferably installed as a three-dimensional computer graphic interface between the operation system and the application software of the present design system 1.

FIG. 1 shows an entire configuration of the system for designing, receiving an order of, and placing a production-order of furniture, which is one embodiment of the present invention. In FIG. 1, a server of the design system 1 for custom-made furniture is connected to PCs of a factory 6, a distributor 4, or a house construction company 5. Further, the design system 1 for custom-made furniture operates website 3.

A distributor 4 or a house construction company 5 proposes a product designed by the design system 1 of the present invention by using PC or a catalogue. After receiving a request of alternation of dimensions or specifications from the customer 2, distributor 4 or house construction company 5 re-proposes the furniture product designed with altered dimensions or specifications with its estimated price and delivery date. Upon receiving a purchase order of the product with re-proposed dimensions, specifications, price, and delivery date from customer 2, the data is transmitted to the server of the design system 1 of custom-made furniture. Upon receiving the purchase order, the server of the design system 1 of custom-made furniture execute calculation of the data necessary for producing the ordered product based on the input data, and transmits the calculated data to factory 6 which cooperates with the design system 1 for production of custom-made furniture. Besides the methods mentioned above, the customer 2 can directly place an order without going through the distributor 4 or the house construction company 5 by accessing the website 3 which is operated by the design system 1 for custom-made furniture, and inputting the data of the desired type and the dimensions of the furniture.

FIG. 2 shows an internal structure of the design system 1 of custom-made furniture which is one embodiment of the present invention.

The system 1 includes a unit designing system for designing units of a furniture product, and a unit assembly system for assembling units designed by using the unit designing system to design the furniture product, and outputting a bill of materials (BOM) and machining specification of each member constituting the product based on data of part members having the same product number.

The designer produces a unit by accessing the unit designing system, and inputting dimensional information on part members of a furniture product, combination information, and information on machining to be provided on the part members.

A person that orders the furniture product designed by using the system of the present invention accesses the unit assembly system, retrieves units that are previously produced by the unit designing system and registered in a memory and adjusts dimensions of the units to combine the units and design a product, and then outputs a bill of materials (BOM) and machining specification of the designed product to a production factory.

Upon receipt of an order for a product designed by using the system, bill of materials and machining specification of part members of the designed product are sorted and created for units and products, and are sent to the factory 6 together with their product number. If required, a design drawing is sent to the factory 6. Instead of printing six views of the product designed according to a customer's request and received an order from the customer, the system 1 may send the production data to the factory 6 so that the manufacturer may print the design drawing in their own format.

FIG. 3(A) shows an example of a PC screen of the unit designing system, which is an embodiment of the present invention. FIG. 3(B) shows an example of a PC screen of the unit assembly system, which is an embodiment of the present invention. At the time of designing a furniture product on the PC screen of the unit designing system of the present invention, it is preferable that all ridge lines of members be aligned with a direction of any one of XYZ coordinate axes on the PC screen. Since all members are grasped as rectangular parallelepiped in the system of the present invention, three sides extending from a corner of the rectangular parallelepiped are set such that they extend in a direction of any one of the world coordinate XYZ axes in the PC screen.

Embodiment 1 (Bookshelf)

FIG. 6 shows a bookshelf designed by using the system of the embodiment of the present invention.
1. Unit and Part Member
<Product Configuration>

Bookshelf of FIG. 6 includes a cabinet (Unit 1) and a shelf (Unit 2). Part members of Unit 1 comprise right side panel 101 (with dowel holes), a left side panel 102 (with dowel holes), back panel 103, top panel 104, and bottom panel 105. Unit 2 include shelf panel 106 (with dowel holes) as a single part member and dowel 107 (four pieces).
A. Operation of Unit Designing System
2. Produce Unit by Unit Designing System
<Cabinet Production>
Step 1) Produce a Cabinet by Assembling Panels Cabinet 100 is produced on a screen by reading out the data of panels stored in the memory, dragging and moving the panels read out on a screen, and placing them with adjustment of position and dimensions. In the example of FIG. 5, cabinet 100 consists of five panels (right side panel 101, left side panel 102, back panel 103, top panel 104, and bottom panel 105).

Referring to FIG. 7(A), cabinet 100 consists of five part members (right side 101, left side panel 102, back panel 103, top panel 104, bottom panel 105). Initial dimensions of right side panel 101 and left side panel 102 are both 700 mm in height (changeable), depth 300 mm (changeable), thickness 15 mm (fixed). Initial dimensions of top panel 104 and bottom panel 105 are both 370 mm in height (changeable), 300 mm in depth (changeable), 15 mm in thickness (fixed). Initial dimensions of back panel 103 is 400 mm in lateral length (changeable), 700 mm in height (changeable), 15 mm in thickness (fixed).
Step 2) Provide Part Member Face-Correlation Between the Panels.

First, CPU 17 gives a numeric identifier to each of six faces of the rectangular parallelepiped of each panel in order to provide face-correlation between the panels (part members) constituting cabinet 100. Assuming that the face of the rectangular parallelepiped of each panel are: upper face is A, front face is B, left side face is C, right side face is D, lower face is E, and back face is F, the six faces of the rectangular parallelepiped of each panel are given numeric identifiers as follows:

101A, 101B, 101C, 101D, 101E, 101F for the six faces of the right side panel 101, 102A, 102B, 102C, 102D, 102E, 102F for the six faces of the left side panel 102, 103A, 103B, 103C, 103D, 103E, 103F for the six faces of the back panel 103, 104A, 104B, 104C, 104D, 104E, 104F for the six faces of the top panel 104, and 105A, 105B, 105C, 105D, 105E, 105F for the six faces of the bottom panel 105.

As the procedure of face-correlating, in the example of FIG. 5, face-correlation is started by setting left side panel 102 as a starting panel as follows:
1. Right side face 102D of left side panel 102 and left side face 104C of top panel 104 are in parallel to each other and on the same plane,
2. Right side face 102D of left side panel 102 and left side face 105C of bottom panel 105 are in parallel to each other and on the same plane,
3. Left side face 102C of left side panel 102 and left side face 103C of back panel 103 are in parallel to each other and on the same plane, 4. Front face 102B of left side panel 102 and front face 101B of right side panel 101 are in parallel to each other and on the same plane,
5. Front face 102B of left side panel 102 and front face 104B of top panel 104 are in parallel to each other and on the same plane,
6. Front face 102B of the left side panel 102 and the front face 105B of the bottom panel 105 are in parallel to each other and on the same plane,
7. Back face 102F of left side panel 102 and back face 101F of right side panel 101 are in parallel to each other and on the same plane,
8. Back face 102F of left side panel 102 and back face 104F of top panel 104 are in parallel to each other and on the same plane,
9. Back face 102F of left side panel 102 and back face 105F of bottom panel 105 are in parallel to each other and on the same plane,
10. Back face 102F of left side panel 102 and front face 103B of back panel 103 are in parallel to each other and on the same plane,
11. Upper face 102A of left side panel 102 and upper face 104A of top panel 104 are in parallel to each other and the latter is placed beneath the former by 0.5 mm,
12. Upper face 102A of left side panel 102 and upper face 101A of right side panel 101 are in parallel to each other and on the same plane,
13. Lower face 102E of left side panel 102 and lower face 105E of bottom panel 105 are in parallel to each other and the latter is placed above the former by 0.5 mm,
14. Lower face 102E of left side panel 102 and lower face 101E of right side panel 101 are in parallel to each other and on the same plane,
15. Upper face 102A of left side panel 102 and upper face 103A of back panel 103 are in parallel to each other and on the same plane, and
16. Lower face 102E of left side panel 102 and lower face 103E of back panel 103 are in parallel to each other and on the same plane.

Because left panel 102 and right panel 101 are not adjacent to each other, cabinet 100 cannot be completely defined by the face-correlation starting from the left side panel 102. Therefore, after completing the face-correlation starting from the left side panel 102, top panel 104, faces of bottom panel 105, and the back panel 103 are face-correlated with the face of the right panel 101 as follows:

17. Left side face 101C of right side panel 101 and right side face 104D of top panel 104 are in parallel to each other and on the same plane,
18. Left side face 101C of right side panel 101 and right side face 105D of bottom panel 105 are in parallel to each other and on the same plane, and
19. Right side face 101D of right side panel 101 and left side face 103D of back panel 103 are in parallel to each other and on the same plane.

FIG. 8 shows part member-face correlations provided between each of the part members that forms cabinet 100. Cabinet 100 constituted by part members that are part member face correlated each other is set as unit 1. Once unit 1 is set, unit design system calculates circumscribing parallelepiped space of the unit 1 as a unit space.

Step 3) Input Unit/Part Member Face-Correlation Between the Six Faces (Face A, Face B, Face C, Face D, Face E, Face F) of Unit 1 and the Corresponding Faces of Part Members Constituting Unit 1, as Follows:

1. Upper face of Unit 1 (face A) and upper face 102A of left side panel 102 are in parallel to each other and distance between the faces is zero.
2. Lower face of Unit 1 (face E) and lower face 102E of left side panel 102 are in parallel to each other and distance between the faces is zero,
3. Left side face of Unit 1 (face C) and left side face 102C of left side panel 102 are in parallel to each other and distance between the faces is zero,
4. Right side face of Unit 1 (face D) and right side face 101D of right side panel 101 are in parallel to each other and distance between the faces is zero,
5. Front face of Unit 1 (face B) and front face 102B of left side panel 102 are in parallel to each other and distance between the faces is zero, and
6. Back face of Unit 1 (face F) and back face 103F of back panel 103 are in parallel to each other and distance between the faces is zero.

Unit/part member face-correlation between the faces of the Unit 1 (cabinet 100) and faces of the part members is shown in FIG. 9.

A face of a part member constituting the unit 1 is unit space/part member face-correlated with a parallel and corresponding face of the unit space of the unit 1. A face of each part member is directly or indirectly part member face-correlated with a parallel and corresponding face of another part member. By providing unit space/part member face-correlation and part member face-correlation in this manner, movement of a face of the unit space of the unit 1 by the unit assembly system accordingly moves a face of a part member of the unit 1, and also accordingly moves a face of another part member that is part member face-correlated with the part member.

In FIG. 7(A) and FIG. 8, neither the face 101E of the right side panel nor the face 102E of the left side panel is part member face-correlated with the face 104E of the top panel. Similarly, neither the face 101A of the right side panel nor the face 102A of the left side panel is part member face-correlated with the bottom panel 105A. The thickness of the top panel 104 is fixed, while the heights of the right side panel 101, left side panel 102, and back panel 103 are changeable. Hence, the face 101E of the right side panel and the face 102E of the left side panel, as well as the face 101A of the right side panel and the face 102A of the left side panel are vertically movable. Accordingly, it is possible to change the height of the cabinet 100 by moving the faces vertically, while keeping the thickness of the top panel 104 fixed.

Step 4) Set a Cell Space in the Cabinet

After inputting the aforementioned face-correlation, a cell space P is set in an internal space of the cabinet 100. The cell space P has face A, face B, face C, face D, face E, and face F in the six directions of arrows indicated in the lower right of FIG. 7(A). The face A, face C, face D, face E, and face F of the cell space P respectively face the face 104E, face 102D, face 101C, face 105A, and face 103B of the cabinet 100. Since the front face of the cabinet 100 is open, there is no face of a part member that faces the face B of the cell space P. By setting the cell space in the internal space of the cabinet 100, it is possible to accommodate an infill unit and provide cell space/unit space face-correlation.

Step 5) Provide Dowel Holes in the Top Panel, Bottom Panel, and Right and Left Side Panels.

In order to join and fix the top panel 104 and the bottom panel 105 of the cabinet 100 with the right and left side panels 102, 103 with dowels, three cylindrical dowel holes having 6 mm outer diameter and 8 mm depth are provided in the right and left butt end faces of each of the top panel 104 and the bottom panel 105. Dowel holes are provided on inner faces of the right and left side panels by transferring the dowel holes provided on the butt end faces of the top panel and the bottom panel to corresponding positions on the right and left side panels. In the system of an embodiment of the present invention, the position of a dowel hole is designated by XY coordinate on a face of a part member in which a center of the circle of the cylindrical dowel hole is used as a reference position.

FIG. 7(B) shows the left butt end face 104C of the top panel 104 of the cabinet 100 in FIG. 7(A). FIG. 7(C) shows positions of the three dowel holes in XY coordinate on the face 102D of the left side panel, when the face 104C is joined with the face 102D. There is a level difference between the upper face of the top panel 104 and the upper faces of the side panels 101 and 102, in which the upper face of the top panel 104 is lowered by 0.5 mm. Similarly, there is a level difference between the lower face of the bottom panel 105 and the lower faces of the side panels 101 and 102, and the lower face of the bottom panel 105 is raised by 0.5 mm. The face 104B of the top panel and the face 105B of the bottom panel are both recessed by 0.5 mm from the front faces 101B, 102B of the right and left side panels 101, 102.

Referring to FIG. 7(B), a two-dimensional coordinate (local coordinate) is set by using the left lower corner of a rectangle of the face 104C as the origin (0, 0) and two sides extending from the origin as x axis and y axis. The three dowel holes a, b, c are provided in the lateral direction of the rectangle such that the dowel holes a and c are placed in positions 30 mm apart from both ends, and the dowel hole b is placed at the center that equally divides the length of the horizontal side. In the vertical direction of the rectangle, all three of the dowel holes a, b, c are placed at the center that equally divides the length (15 mm) of the vertical side.

The depth of the top panel is 299.5 mm, which is 0.5 mm shorter than the depth 300 mm of the side panel, while the thickness (fixed) of the top panel is 15 mm. Hence, in a local coordinate where the left lower corner of a rectangle of the face 104C is set as the origin (0, 0), the positions of the three dowel holes a, b, c are a(30 mm, 7.5 mm), b(149.75 mm, 7.5 mm), c(269.5 mm, 7.5 mm).

Next, referring to FIG. 7(C), assume that the dowel holes a, b, c in the face 104C are perpendicularly projected onto the face 102(D) of the left side panel of the cabinet 100, and are denoted by a', b', c'. In XY coordinate where the left lower corner of a rectangle of the face 102D of the left side panel is set as the origin (0, 0), the positions of a', b', c' are a'(30.5 mm, 692.0 mm), b'(150.25 mm, 692.0 mm), c'(270.0 mm, 692.0 mm).

The above explanation also applies to dowel holes provided on the face 102D of the left side panel, and on the left butt end face 105C of the bottom panel 105 joined to the face 102D of the left side panel with dowels. Also, since the cabinet 100 has a symmetrical structure, the same applies to the face 104D of the top panel and the face 101C of the right side panel, as well as the face 105D of the bottom panel and the face 101C of the right side panel.

<Movable Shelf Panel Production>
Step 6) Produce a Movable Shelf Panel 106 (Unit 2).

A panel read out by clicking an icon is displayed on the screen as a part member of a movable shelf panel 106. Initial dimensions of the movable shelf panel are 369 mm in lateral length, 299.5 mm in depth, and 15 mm (fixed) in thickness. To facilitate movement of the movable shelf panel inside the cabinet, the lateral length of the movable shelf panel is set 1 mm smaller than the width of the cell space of the cabinet.

Step 7) The movable shelf panel 106 is set as a Unit 2, and unit space/part member face-correlation is provided between the movable shelf panel 106 and the unit space of the Unit 2 with zero distance therebetween. The movable shelf 106 is set as the Unit 2 formed only of a single part member. The circumscribing parallelepiped space of the Unit 2 is set as the unit space of the Unit 2.

Step 8) Determine the Position of Dowel Holes for Dowels that Support the Shelf Panel.

Referring to FIGS. 10(A), (B), and (C), three dowel holes for supporting the bottom of the movable shelf panel with dowels are provided in a right side face 102D of the left side panel 102. In order to vertically move the movable shelf panel 106 inside the cabinet, positions of the dowel holes in the face 102D of the left side panel need to be changeable according to the height of the shelf panel 106. Hence, the positions of the dowel holes provided on the face 102D of the side panel are set based on the position of the butt end face 106C of the movable shelf panel 106. Positions on the face 102D of the side panel determined by perpendicularly projecting, onto the face 102D, virtual reference positions set on the basis of the butt end face 106C of the shelf panel 106 are set as the positions of the dowel holes on the face 102D.

Referring to FIG. 10(B), XY coordinate (local coordinate) is set where the left lower corner of a rectangle of the face 106C of the shelf panel is the origin, and reference positions g, h, i for providing the dowel holes on the face 102D of the left side panel are designated by the XY coordinate set on the rectangle of the face 106C of the shelf panel. In the bookshelf of Embodiment 1, initial dimensions of the movable shelf panel 106 are 299.5 mm in depth and 15 mm in thickness, while the outer diameter of the dowel hole is 6 mm. Therefore, the dowel hole reference positions g, h, i are g(30 mm, −3 mm), h(149.75 mm, −3 mm), and i(269.5 mm, −3 mm) in this order from the left end of the rectangle of the face 106C of the shelf panel.

Since the shelf panel 106 in FIG. 6 is provided at a height where it equally divides the lengths of the right and left side panels in the height direction, the cabinet 100 is symmetrical with respect to the shelf panel 106. Accordingly, the settings of the dowel holes between the top panel and the side panel can be copied to the settings between the bottom panel and the side panel. Additionally, since the cabinet 100 accommodating the shelf panel 106 is bilaterally symmetrical, information about one face of the shelf panel can be copied to the opposite face, the information including the dowel holes (reference position) set on the face of the shelf panel 106 and boring of the dowel holes on the face of the side panel.

B. Operation of Unit Assembly System
3. Produce Product by Reading Out Units and Combining them on a Screen.
Step 9) Display Unit 1 and Unit 2 on a Screen.

Click a MENU screen icon of the unit assembly system to read desired types of units from among units designed by using the unit designing system and registered in the memory, and display the units on the screen. In this case, a unit of a cabinet is read and displayed as a Unit 1, and a unit formed of a part member which is a panel for a shelf panel is read and displayed as a Unit 2.

Step 10) Accommodate the Movable Shelf Panel (Unit 2) in the Cabinet (Unit 1).

The movable shelf panel 106 is dragged to a desired height in the cell space P of the cabinet 100 shown in FIG.

6. In FIG. 6, the movable shelf panel 106 is initially set at the center of the right and left side panels in the height direction.

The shelf panel 106 is accommodated in the cell space P surrounded by the side panels 101, 102, top panel 104, bottom panel 105, and back panel 103, which are part members of the cabinet 100. In the example of FIG. 6, at the position to which the shelf panel 106 is dragged, the surrounding four faces (face 106B, face 106C, face 106D, face 106F) of the shelf panel 106 are cell space/unit space face-correlated with corresponding four faces (face B, face C, face D, face F) of the cell space P with zero distance therebetween.

When the movable shelf panel 106 is accommodated in the cell space P, dowel holes for supporting the shelf panel are transferred to the inner face of the right and left side panels. As shown in FIG. 10(A), the lower face of the shelf panel 106 is supported by the dowels inserted into the three dowel holes provided in the left side panel, and therefore no dowel hole is provided directly in the butt end face of the shelf panel. The butt end face 106C of the shelf panel is provided with virtual reference positions for determining positions of the dowel holes to be provided on the face 102D of the left side panel, which is opposite to the butt end face 106.

Referring to FIG. 10(B), in xy coordinate (local coordinate) where the left lower corner of a rectangle of the face 106C is set as the origin, the reference positions g, h, i of the dowel holes of the face 106C of the shelf panel are g(30 mm, −0.3 mm), h(149.75 mm, −0.3 mm), and i(269.5 mm, −0.3 mm). Assume that g", h", i" denote positions determined by perpendicularly projecting the positions g, h, i onto the right side face 102D of the left side panel 102 in the vertical direction to the face 106C. In this case, in XY coordinate where the left lower corner of a rectangle of the right side panel is set as the origin, the coordinate of g", h", i" are g"(30.5 mm, 339.5 mm), h"(150.25 mm, 339.5 mm), and i"(270 mm, 339.5 mm).

When the shelf panel 106 is accommodated in the cell space P of the cabinet 100, the dowel machining input in the positions g, h, i determined based on the butt end face of the shelf panel 106 is automatically transferred and input into positions g", h", i" on the right side face 102D of the left side panel 102.

Since settings of the positions of the dowel holes on the face 106C of the shelf panel and the face 102D of the left side panel are the same as on the opposite surfaces which are the surface 106D of the shelf panel and the face 101C of the right side panel, machining input on the face 106D of the shelf panel and the face 101C of the right side panel may be copied to the opposite face.

Step 11) Input an Alteration of a Dimension of the Unit

Referring to FIGS. 6, 7, 8, and 9, an operation of changing the depth of the cabinet 100 (Unit 1) from 300 mm to 400 mm is explained.

When faces of the cabinet 100 are moved 100 mm in the depth direction (direction F) toward the back face (face F) of the unit space, since the thickness of the back panel 103 is fixed, and, referring to FIG. 8, both the face 102F and face 101F are part member face-correlated with the face 103B of the back panel with zero distance therebetween, both the face 102F of the left side panel 102 and the face 101F of the right side panel 101 move 100 mm in the depth direction (direction F). Since the depths of the left side panel 102 and the right side panel 101 are set to be changeable, the depths of the left side panel 102 and the right side panel 101 are increased by 100 mm, and reaches 400 mm. Note that the face 102B and face 101B are not part member face-correlated with the face 103F and face 103B of the back panel, and therefore do not move in accordance with the movement of the face 103F and face 103B of the back panel in direction F caused by the movement of the back face (face F) of the unit space in direction F.

FIG. 11 shows positions of the dowel holes after changing the depth of the cabinet 100 from 300 mm to 400 mm.

Similarly, referring to FIGS. 6, 7, 8, and 9, an operation of lowering the height of the cabinet 100 (Unit 1) by 10 mm from 700 mm to 690 mm is explained.

In FIG. 9, since the upper face (face A) of the Unit 1 is unit/part face-correlated with the upper face 102A of the left side panel, if the height of the Unit 1 is set to 690 mm, the face 102A of the left side panel is accordingly moved 10 mm downward based on the relationship (zero distance between the faces) set by the face-correlation. Then, referring to FIG. 8, since the upper face 102A of the left side panel is face-correlated with and parallel to the upper face 104A of the top panel 104 with a 0.5 mm distance therebetween, the upper face 104A of the top panel 104 is lowered 10 mm downward while maintaining the 0.5 mm distance from the face 102A of the left side panel. Moreover, since the upper face 102A of the left side panel is face-correlated with the upper face 101A of the right side panel 101 and the upper face 103A of the back panel 103 with zero distance therebetween, movement of the upper face 102A of the left side panel 10 mm downward accordingly moves the face 101A of the right side panel and the face 103A of the back panel 10 mm downward. As a result, changing of the height of the Unit 1 to 690 mm reduces the height of all of the part members 101, 102, 103 by 10 mm, so that they all become 690 mm.

FIG. 12 shows positions of the dowel holes after changing the height of the cabinet 100 from 700 mm to 690 mm. While FIG. 12 shows the settings of the positions of the dowel holes on the face 102D of the left side panel, the same applies to settings of the positions of dowel holes on the face 101C of the right side panel.

Further, referring to FIGS. 6, 7, 8, 9, and 10, an operation of lowering the position of the shelf panel 106 (Unit 2) accommodated in the cabinet 100 (Unit 1) by 10 mm is explained.

In FIG. 10, since the shelf panel 106 is provided at the center that equally divides the height of the side panel, the lower face 106E of the shelf panel 106 is provided at a 342.5 mm (700 mm×½−7.5 mm) distance from both of the lower face 102E of the left side panel 102 and the lower face 101E of the right side panel 101.

While the shelf panel 106 as a part member constitutes the Unit 2, and has its surrounding four faces (face B, face C, face D, and face F) cell space/unit space face-correlated with the face B, face C, face D, and face F of the cell space P with zero distance therebetween, the distance between the upper face (face A) and the lower face (face E) of the shelf panel 106 is not fixed. Accordingly, the shelf panel 106 can move freely in the vertical direction, while following the cell space/unit space face-correlation set for its surrounding four faces.

Assume that the bottom face 106E of the shelf panel 106 is lowered 10 mm so that the distance between the bottom face 106E and the bottom face of the right side panel 101 is 332.5 mm. In this case, as shown in FIGS. 10(C) and 13, Y coordinate of the reference positions g, h, i of the face 106C is lowered 10 mm, whereby the Y coordinate of the machinings g", h", i" provided on the face 102D are lowered 10 mm on the XY coordinate set on the face 102D.

FIG. 13 shows positions of the dowel holes after lowering the height of the shelf panel of the cabinet 100 by 10 mm.

Step 12) Calculate and Display a Specification of the Designed Bookshelf, and an Estimated Cost and Date of Delivery.

Calculate an estimate of the cost and date of delivery of the designed bookshelf after the alteration of the dimension in Step 11 based on the members constituting the bookshelf and the time required for the procurement. Then display the result together with a three-dimensional structure image of the designed bookshelf on the PC screen.

FIG. 18 is an example of master data of prices and the time required for the procurement of the members used for the bookshelf of the embodiment. The price and time required for the procurement of each member is presented by the factory 6, and are stored in the memory of the system of the present invention.

In the embodiment, the estimated cost of the product is calculated by adding the wage, other expenses and profit to the total of prices of the part members used in production of the product based on the prices of the members registered in the master data of the part members. As for the date of delivery of the product, the date of delivery of the bookshelf is calculated by adding periods of machining, assembly, packing, and delivery to the longest required time among the times required for the procurement of the plurality of part members used for producing the product based on the time required for the procurement of the members registered in the master data of the part members.

Step 13) Inquire Customer to Confirm whether the Displayed Product is OK.

Output and display the bookshelf having the dimensions altered by inputting the change to the unit, as a three-dimensional structure image on the PC screen. If the customer is satisfied with the specification and estimated cost and date of delivery of the product output on the screen, the customer confirms the purchase of the proposed furniture product. If the customer is not satisfied with the displayed specification, cost, or date of delivery and desires any change of them, the process returns to the input of the alteration in Step 11.

Note that the system of the embodiment does not specify details such as whether to use an adhesive or screws as means for joining the part members. Such details can be input as setting of machining to be provided on the part member. Alternatively, the way of joining the part members may be left to the production factory working in cooperation, instead of specifying by the system of the present invention.

4. Order Production of the Product.

Step 14) Send Production Data of the Product Ordered by the Customer to a Production Factory Through the Furniture Product Designing System 1.

In the embodiment of the present invention, the production data provided to the production factory includes: 1. bill of materials (BOM data) of part members, 2. machining specification, and 3. design drawings.

1. Bill of Materials (BOM Data)

FIG. 14 shows bill of materials data (BOM data) of members of the bookshelf designed by using the system of the embodiment. Product number 001 is assigned to the bookshelf. The two units (cabinet and shelf) constituting the bookshelf are assigned unit number 1 and unit number 2, respectively. A part member number is assigned to each part member of the Units 1 and 2, and a material, width, height, thickness, and quantity is specified for each part member.

2. Machining Specification

FIG. 15(A) shows machining specification of dowel holes provided on the left side panel 102 of the bookshelf designed by using the system of the embodiment. FIG. 15(B) shows machining specification of dowel holes on the left side panel 102 when the height of the bookshelf is lowered by 10 mm. FIG. 15(C) shows machining specification of dowel holes on the left side panel 102 when the position of the shelf panel 106 is lowered by 10 mm.

While FIGS. 15(A), (B), and (C) only show dowel hole machining provided on the face 102D of the left side panel facing the face 106C of the shelf panel, the same dowel hole machining is also provided on the face 101C of the right side panel facing the face 106D of the shelf panel.

3. Design Drawings

FIGS. 16(A), (B), and (C) are a plan view, front view, and right side view of the bookshelf of FIG. 6 designed by using the system of the embodiment. FIGS. 17(A) to (F) are a front view, plan view, and side view of (A) right side panel, (B) left side panel, (C) top panel, (D) back panel, (E) bottom panel, and (F) shelf panel 106 of the bookshelf of FIG. 6 designed by using the system of the embodiment. Since (F) shelf panel 106 uses a composite panel, indications of surface sheets and butt end sheets attached to six faces thereof are shown.

Step 15) The production factory receives data of the bill of materials (BOM) and machining specification, and produces the product according to the data. By cooperating with the system, the production factory receives the bill of materials (BOM data) of FIG. 14 and the machining specification data of FIG. 15 mentioned above, and can thereby automatically machine the ordered furniture product by an automated production line. The production factory may use the design drawings shown in FIGS. 16(A) to (C) and FIG. 17(A) to (F), and produce the ordered furniture product by a conventional method based on drawings, instead of using an automated production line. Alternatively, the production factory may produce the ordered furniture product by using both the automated production line and the conventional production method.

Embodiment 2 (Storage Case with Drawer)

FIGS. 20(A), (B) show a storage case with drawer as another embodiment of the present invention. The storage case with drawer of FIG. 20 is formed of a cabinet 100 (Unit 1), a drawer inner box 200 (Unit 2), a drawer front panel 300 (Unit 3), and a handle 400 (Unit 4). Although the handle 400 is not rectangular parallelepiped, its minimum circumscribing parallelepiped space is set as the contour of the handle 400, and is regarded as a part member having a rectangular parallelepiped contour as in the case of a panel.

The Unit 1 (cabinet 100) is a skeleton unit, and has a cell space P1 and a cell space P2. The Unit 2 (drawer inner box) is an infill unit, and is accommodated in and cell space/unit space face-correlated with the cell space P2 of the cabinet 100 in FIG. 20(A). The Unit 3 (drawer front panel 300) and Unit 4 (handle 400) are combined with the Unit 2 (drawer inner box) to form a drawer, while the drawer is combined with the cabinet (Unit 1) to form the storage case with drawer which is a product.

The Unit 1 (cabinet 100) is formed of part members including a right side panel 101, a left side panel 102, a back panel 103, a top panel 104, a bottom panel 105, and a shelf panel 106. The part members of the Unit 1 are unit space/part member face-correlated with six faces of a unit space of the Unit 1, and faces of part members in parallel with each other are part member face-correlated.

Part members of the Unit 2 (drawer inner box 200) are a drawer left end panel 201, a drawer right end panel 202, a drawer bottom panel 203, and a drawer tip panel 204. The part members of the Unit 2 are unit space/part member face-correlated with six faces of a unit space of the Unit 2, and faces of part members in parallel with each other are part member face-correlated. The part member of the Unit 3 (drawer front panel 300) is the drawer front panel 300 alone. Similarly, the part member of the Unit 4 (handle 400) is the handle 400 alone.

The unit spaces of the Unit 3 (drawer front panel 300) and the Unit 2 (drawer inner box) are unit space face-correlated, and it is determined by the unit space face-correlation that the distance between the back face (face F) of the unit space of the drawer front panel and the front face (face B) of the unit space of the drawer inner box is zero. The unit spaces of the Unit 1 (cabinet 100) and the Unit 3 (drawer front panel) are unit space face-correlated, and it is determined by the unit space face-correlation that the distance between the back face (face F) of the unit space of the Unit 3 (drawer front panel) and the front face (face B) of the unit space of the Unit 1 (cabinet 100) is 5 mm. The unit spaces of the Unit 3 (drawer front panel) and the Unit 4 (drawer handle 400) are unit space face-correlated, and it is determined by the unit space face-correlation that the distance between the front face (face B) of the unit space of the drawer front panel and the back face (face F) of the drawer handle is zero.

After setting the correlations described above, when the lower face of the unit space of the Unit 1 (cabinet 100) is lowered 10 mm downward (direction E), the lower face of a part member unit space/part member face-correlated with the lower face of the unit space moves 10 mm downward (direction E). Then, the lower face of another part member that is part member face-correlated with the part member moves downward 10 mm according to the distance between faces set by the part member face-correlation, whereby the dimension of the other part member is altered, and the dimension of the cell space P2 of the Unit 1 (cabinet 100) is altered. The alteration of the dimension of the cell space P2 alters the dimension of the unit space of the drawer inner box Unit 2 that is cell space/unit space face-correlated with the cell space P2. The alteration of the dimension of the unit space of the drawer inner box Unit 2 alters dimensions of part members constituting the drawer inner box Unit 2 according to the unit space/part member face-correlation and part member face-correlation.

The alteration of the dimension of the Unit 1 (cabinet 100) alters the dimension of the drawer front panel unit according to the unit space face-correlation provided between the unit space of the Unit 1 and the unit space of the front panel Unit 3. As a result, the dimension of the drawer front panel as a part member is altered.

The alteration of the dimension of the drawer front panel Unit 3 alters the dimension of the handle Unit 4 attached to the drawer front panel according to the unit space face-correlation that determines that the distance between the front face (face B) of the unit space of the front panel unit 3 and the face F of the unit space of the handle Unit 4 is zero. As a result, the dimension of the drawer handle as a part member is altered.

Embodiment 3 (Storage Case with Door)

FIG. 21 shows a storage case with door as another embodiment of the present invention. The storage case with door (product) of FIG. 21 is formed of a cabinet 100 (Unit 1), a door 300 (Unit 2), and a handle 400 (Unit 3). A distance of 2 mm is provided between the door 300 and the cabinet 100.

Faces of part members constituting the Unit 1 (cabinet 100) are part member face-correlated with zero distance therebetween. A unit space of the Unit 1 and faces of the part members constituting the Unit 1 (cabinet 100) are unit space/part member face-correlated with zero distance therebetween.

A unit space 1 of the Unit 1 and a unit space 2 of the Unit 2 (door) are unit space face-correlated with a 2 mm distance between the door and the cabinet. In FIG. 21, the upper face (face A) of the unit space 1 and the upper face (face A) of the unit space 2 are in parallel with each other and on the same plane. The left side face (face C) of the unit space 1 and the left side face (face C) of the unit space 2 are in parallel with each other and on the same plane. The right side face (face D) of the unit space 1 and the right side face (face D) of the unit space 2 are in parallel with each other and on the same plane. The lower face (face E) of the unit space 1 and the lower face (face E) of the unit space 2 are in parallel with each other and on the same plane. The front face (face B) of the unit space 1 of the Unit 1 and the back face (face F) of the unit space 2 of the Unit 2 are in parallel with each other with a 2 mm distance therebetween. The thickness of the door is fixed to 15 mm.

The Unit 2 (door) and the Unit 3 (door handle 400) are placed such that the handle (circumscribing parallelepiped space) is joined to the front face of the door. In FIG. 21, the upper face (face A) of the unit space 2 and the upper face (face A) of the unit space 3 are in parallel with each other with a predetermined distance therebetween. The left side face (face C) of the unit space 2 and the left side face (face C) of the unit space 3 are in parallel with each other with a predetermined distance therebetween. The right side face (face D) of the unit space 2 and the right side face (face D) of the unit space 3 are in parallel with each other with a predetermined distance therebetween. The lower face (face E) of the unit space 2 and the lower face (face E) of the unit space 3 are in parallel with each other with a predetermined distance therebetween. The front face (face B) of the unit space 2 and the back face (face F) of the unit space 3 are in parallel with each other and on the same plane.

After setting the correlations described above, when the upper face of the unit space of the Unit 1 (cabinet 100) is moved 10 mm upward (direction A), the upper face of the unit space of the door Unit 2 that is unit space face-correlated with the upper face of the unit space of the cabinet Unit 1 moves 10 mm upward (direction A). Then, the upper face of the unit space of the door handle Unit 3 that is unit space face-correlated with the unit space of the door Unit 2 moves upward (direction A) according to the relationship set by the unit space face-correlation. As a result, positions and dimensions of the part members constituting the Units 1, 2, and 3 are changed in a linked manner.

Although the embodiments described above are products having the simplest structures as a furniture product for the sake of simplicity of the explanation of the present invention, the invention is also applicable to furniture products having more complex structures. Additionally, while the present invention can be suitably used for designing and production of furniture products, application thereof is not limited to furniture products, and can be widely used for designing and production of three-dimensional structures consisting of a plurality of members.

The invention claimed is:

1. A method for designing part members of a furniture product formed by combining a plurality of part members by using a computer, the method comprising:
   reading out data of part members stored in a memory to display a first part member and a second part member, each having a rectangular parallelepiped shape, and locating the first part member and the second part member on a screen such that a first face of the first part member and a second face of the second part member face in parallel with each other;
   setting a XY coordinate on each face of the first part member and the second part member such that a corner of a rectangle of each face of the first part member and the second part member is set as an origin, and two sides extending orthogonally from the corner are set as a X axis and Y axis, wherein a first position on the first face is designated by the XY coordinate;
   perpendicularly projecting the first face of the first part member onto the second face of the second part member and calculate a two dimensional positional relationship between the first face and the second face, and, based on the calculated positional relationship between the two faces, calculate a position on the second face that corresponds to the first position on the first face and designate the calculated position as a second position by the XY coordinate on the second face;
   inputting a selected machining on the first position on the first face to transfer and input the input machining to the second position on the second face; and
   outputting data of dimensions of the first part member and the second part member together with the data of machining that are provided on the six faces of the first part member and the second part member.

2. The method according to claim 1, wherein,
   the first position on the XY coordinate on the first face of the first part member is determined as a function of a lateral length and/or vertical length of the rectangle of the first face; and
   an alteration of the lateral length and/or vertical length of the rectangle of the first face alters the first position on the XY coordinate on the first face, thereby the second position on the XY coordinate on the second face is altered accordingly.

3. The method according to claim 1, wherein the first part member and the second part member are part member face-correlated by determining a distance between parallel and corresponding two faces thereof.

4. The method according claim 1, wherein:
   a virtual three-dimensional rectangular parallelepiped space that circumscribes both the first part member and the second part member is set; and
   each of six faces of the virtual three-dimensional rectangular parallelepiped space is unit space/part member face-correlated with a face of the first part member and a face of the second part member, respectively, by determining a distance between corresponding parallel two faces of the first part member and the second part member.

5. A program for causing a computer to execute each step according to claim 1.

* * * * *